US010936761B2

(12) United States Patent
Velusamy et al.

(10) Patent No.: US 10,936,761 B2
(45) Date of Patent: *Mar. 2, 2021

(54) ANTI-THEFT RECOVERY TOOL

(71) Applicant: T-Mobile USA, Inc., Bellevue, WA (US)

(72) Inventors: Senthil Kumar Mulluppadi Velusamy, Redmond, WA (US); Kevin Lau, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/942,431

(22) Filed: Jul. 29, 2020

(65) Prior Publication Data

US 2020/0356704 A1 Nov. 12, 2020

Related U.S. Application Data

(63) Continuation of application No. 14/795,850, filed on Jul. 9, 2015, now Pat. No. 10,769,315.

(Continued)

(51) Int. Cl.
*H04M 1/66* (2006.01)
*G06F 21/88* (2013.01)
(Continued)

(52) U.S. Cl.
CPC .............. *G06F 21/88* (2013.01); *H04L 63/20* (2013.01); *H04W 4/12* (2013.01);
(Continued)

(58) Field of Classification Search
CPC .. G06F 21/88; G06F 12/14; G06F 2221/2111; H04L 63/20; H04L 63/0823;
(Continued)

(56) References Cited

U.S. PATENT DOCUMENTS 6,327,660 B1 12/2001 Patel
7,266,371 B1 9/2007 Amin et al.
(Continued)

FOREIGN PATENT DOCUMENTS

CN 1331371 A 8/2007
CN 101043327 A 9/2007
(Continued)

OTHER PUBLICATIONS

"3rd Generation Partnership Project; Technical Specification Group Services and System Aspects; Personalisation of Mobile Equipment (ME); Mobile functionality specification(3G TS 22.022 version 3.0.1 )", vol. SA WG3, May 29, 2000 (May 29, 2000), XP050435722.
(Continued)

*Primary Examiner* — Mahendra R Patel
(74) *Attorney, Agent, or Firm* — Han Santos, PLLC

(57) ABSTRACT

An anti-theft protection disablement solution is provided to authorized users and authorized customer service representatives. An anti-theft protection disablement request message from a recovery application on a user device may be received via a cloud messaging service or a binary messaging service. In turn, an anti-theft protection disablement message may be transmitted to the user device via the cloud messaging service or the binary messaging service when the anti-theft protection disablement request message is authenticated. The anti-theft protection disablement message may disable an anti-theft protection function on the user device that calls for an input of an anti-theft protection authentication credential for a factory reset of the user device.

18 Claims, 10 Drawing Sheets

Related U.S. Application Data

(60) Provisional application No. 62/086,079, filed on Dec. 1, 2014.

(51) Int. Cl.
    *H04W 4/12* (2009.01)
    *H04W 12/12* (2021.01)
    *H04L 29/06* (2006.01)
    *H04W 12/10* (2021.01)

(52) U.S. Cl.
    CPC ..... *H04W 12/1206* (2019.01); *H04L 63/0823* (2013.01); *H04W 12/10* (2013.01)

(58) Field of Classification Search
    CPC .. H04L 9/32; H04L 2209/80; H04W 12/1206; H04W 4/12; H04W 12/10; H04W 12/08; H04W 88/02; H04M 1/66
    USPC ........................................................ 455/411
    See application file for complete search history.

(56) References Cited

U.S. PATENT DOCUMENTS

| | | |
|---|---|---|
| 7,783,281 B1 | 8/2010 | Cook et al. |
| 8,321,916 B2 | 11/2012 | Aissi et al. |
| 8,463,239 B1 | 6/2013 | Koller et al. |
| 8,666,366 B2 | 3/2014 | DeAtley |
| 9,055,443 B2* | 6/2015 | Froelich ............ H04W 12/0802 |
| 9,172,538 B2 | 10/2015 | Obaidi |
| 9,319,884 B2 | 4/2016 | Buzescu et al. |
| 9,426,661 B2 | 8/2016 | Obaidi |
| 9,591,484 B2* | 3/2017 | Ionescu .................... G06F 21/51 |
| 9,807,607 B2 | 10/2017 | Velusamy |
| 9,813,399 B2 | 11/2017 | Velusamy |
| 10,075,848 B2 | 9/2018 | Velusamy et al. |
| 10,341,871 B2 | 7/2019 | Velusamy et al. |
| 2003/0159036 A1 | 8/2003 | Walmsley et al. |
| 2005/0188216 A1* | 8/2005 | Crispin ................ H04L 9/0637 713/190 |
| 2006/0075259 A1* | 4/2006 | Bajikar ............... H04L 63/0428 713/189 |
| 2007/0026861 A1 | 2/2007 | Kuhn et al. |
| 2007/0072620 A1 | 3/2007 | Levitan |
| 2007/0154014 A1 | 7/2007 | Aissi et al. |
| 2007/0264990 A1* | 11/2007 | Droste .................. H04W 88/02 455/418 |
| 2008/0090614 A1 | 4/2008 | Sicher et al. |
| 2008/0125084 A1* | 5/2008 | Cambois ............... H04W 88/02 455/411 |
| 2008/0132226 A1 | 6/2008 | Carnall |
| 2008/0209206 A1* | 8/2008 | Vaha-Sipila ........ H04L 63/0823 713/155 |
| 2008/0212781 A1 | 9/2008 | Vennelakanti et al. |
| 2008/0282084 A1 | 11/2008 | Hatakeyama |
| 2008/0307494 A1 | 12/2008 | Holtzman et al. |
| 2009/0165119 A1 | 6/2009 | Ramanath |
| 2009/0270126 A1 | 10/2009 | Liu |
| 2009/0305668 A1 | 12/2009 | Ahn et al. |
| 2009/0325646 A1* | 12/2009 | Stewart .................... H04M 3/02 455/567 |
| 2010/0009659 A1 | 1/2010 | Netanel et al. |
| 2010/0082968 A1* | 4/2010 | Beverly ................ G06F 21/575 713/2 |
| 2010/0162368 A1 | 6/2010 | Aissi et al. |
| 2010/0222047 A1 | 9/2010 | Vanderlinden et al. |
| 2010/0263043 A1* | 10/2010 | Xu .......................... G06F 21/85 726/17 |
| 2010/0273452 A1* | 10/2010 | Rajann .................. H04W 4/029 455/411 |
| 2010/0299744 A1 | 11/2010 | Mardiks |
| 2010/0306533 A1* | 12/2010 | Phatak .................... G06F 21/40 713/156 |
| 2011/0076986 A1 | 3/2011 | Glendinning et al. |
| 2011/0130118 A1* | 6/2011 | Fan ........................ H04W 8/183 455/411 |
| 2011/0134881 A1 | 6/2011 | Sanders et al. |
| 2011/0154030 A1* | 6/2011 | Hazra .................... G06F 21/88 713/164 |
| 2011/0159843 A1 | 6/2011 | Heath et al. |
| 2011/0212706 A1* | 9/2011 | Uusilehto ......... H04M 1/72572 455/411 |
| 2011/0269422 A1* | 11/2011 | Xu .................... H04M 15/8083 455/411 |
| 2012/0042376 A1 | 2/2012 | Dolgunov et al. |
| 2012/0042396 A1* | 2/2012 | Guerra .................... G06F 21/88 726/30 |
| 2012/0083242 A1 | 4/2012 | Spitz et al. |
| 2012/0101941 A1 | 4/2012 | Kang et al. |
| 2012/0304255 A1 | 11/2012 | Carnes |
| 2013/0078951 A1 | 3/2013 | Mun et al. |
| 2013/0122864 A1 | 5/2013 | Haggerty et al. |
| 2013/0167208 A1 | 6/2013 | Shi |
| 2013/0210389 A1* | 8/2013 | Obaidi .................. H04W 8/245 455/411 |
| 2013/0237174 A1 | 9/2013 | Gusikhin et al. |
| 2013/0305047 A1 | 11/2013 | Xi et al. |
| 2013/0326643 A1* | 12/2013 | Pai ........................... G06F 3/017 726/35 |
| 2014/0038556 A1 | 2/2014 | Sousa |
| 2015/0106456 A1 | 4/2015 | Hoek |
| 2015/0242644 A1* | 8/2015 | Sonasath ................. G06F 21/88 726/26 |
| 2016/0014063 A1 | 1/2016 | Hogeg et al. |
| 2016/0029220 A1 | 1/2016 | Obaidi |
| 2016/0127898 A1* | 5/2016 | Gupta ...................... G06F 21/43 726/7 |
| 2016/0154982 A1 | 6/2016 | Velusamy et al. |

FOREIGN PATENT DOCUMENTS

| | | |
|---|---|---|
| CN | 101398872 A | 4/2009 |
| CN | 102917339 B | 6/2014 |
| CN | 104081403 A | 10/2014 |
| CN | 104335619 A | 2/2015 |
| CN | 103493079 B | 3/2017 |
| EP | 2063378 A2 | 5/2009 |
| EP | 2384038 A4 | 4/2013 |
| EP | 2640105 A1 | 9/2013 |
| EP | 2672420 A2 | 12/2013 |
| EP | 2839687 A1 | 2/2015 |
| EP | 2839690 A1 | 2/2015 |
| EP | 2771833 | 6/2015 |
| WO | 2013063353 A1 | 5/2013 |
| WO | 2013158977 A1 | 10/2013 |
| WO | 2013158999 A1 | 10/2013 |
| WO | 2013179633 A1 | 12/2013 |
| WO | 2013158971 A1 | 10/2015 |
| WO | 2016053498 A1 | 4/2016 |

OTHER PUBLICATIONS

"Chinese Office Action" for Chinese Patent Application No. 201280053062.8, dated Feb. 26, 2016, 23 pages.
"Chinese Office Action" for Chinese Patent Application No. 201380020694.9, dated Jun. 2, 2017, 18 pages.
"European Search Report" for EP Patent Application No. 12843678.9, dated May 20, 2015, 8 pages.
"European Search Report" for EP Patent Application No. 13778691.9, dated Nov. 27, 2015, 9 pages.
"European Search Report" for EP Patent Application No. 13778922.8, dated Nov. 11, 2015, 6 pages.
"Final Office Action" for U.S. Appl. No. 14/795,850, dated Mar. 9, 2017, 19 pages.
"Final Office Action" for U.S. Appl. No. 13/796,550, dated May 13, 2015, 22 pages.
"Final Office Action" for U.S. Appl. No. 13/796,550, dated May 23, 2016, 27 pages.
"Final Office Action" for U.S. Appl. No. 13/796,550, dated Mar. 29, 2017, 25 pages.

(56) References Cited

OTHER PUBLICATIONS

"Final Office Action" for U.S. Appl. No. 13/839,189, dated Jul. 11, 2016, 19 pages.
"Final Office Action" for U.S. Appl. No. 13/839,189, dated Aug. 21, 2015, 16 pages.
"Notice of Allowance" for U.S. Appl. No. 13/660,350, dated Nov. 26, 2014, 12 pages.
"Notice of Allowance" for U.S. Appl. No. 13/839,189, dated Oct. 24, 2016, 16 pages.
"Notice of Allowance" for U.S. Appl. No. 13/840,045, dated Feb. 1, 2016, 10 pages.
"Notice of Allowance" for U.S. Appl. No. 13/840,045, dated Mar. 17, 2016, 6 pages.
"Notice of Allowance" for U.S. Appl. No. 13/840,045, dated Feb. 18, 2015, 8 pages.
"Notice of Allowance" for U.S. Appl. No. 13/840,045; dated Dec. 10, 2015, 11 pages.
"Notice of Allowance" for U.S. Appl. No. 13/842,116, dated Jun. 12, 2015, 12 pages.
"Notice of Allowance" for U.S. Appl. No. 13/842,116, dated Sep. 30, 2015, 8 pages.
"Notice of Allowance" for U.S. Appl. No. 14/874,023, dated Apr. 7, 2016, 11 pages.
"Office Action" for U.S. Appl. No. 13/796,550, dated Nov. 10, 2016, 27 pages.
"Office Action" for U.S. Appl. No. 13/796,550, dated Jan. 11, 2016, 33 pages.
"Office Action" for U.S. Appl. No. 13/796,550, dated Jan. 26, 2015, 29 pages.
"Office Action" for U.S. Appl. No. 13/839,189, dated Dec. 23, 2015, 19 pages.
"Office Action" for U.S. Appl. No. 13/839,189, dated Feb. 24, 2015, 37 pages.
"Office Action" for U.S. Appl. No. 13/840,045, dated Jul. 29, 2015, 15 pages.
"Office Action" for U.S. Appl. No. 13/842,116, dated Jan. 27, 2015, 28 pages.
"Office Action" for U.S. Appl. No. 14/795,850, dated Sep. 9, 2016, 19 pages.
"Office Action" for U.S. Appl. No. 14/856,742, dated Mar. 27, 2017, 12 pages.
"Office Action" for U.S. Appl. No. 14/874,023, dated Dec. 21, 2015, 16 pages.
Becher, Michael; Freiling, Felix C.; Hoffman, Johannes; Holz, Thorsten; Uellenbeck, Sebastian; Wolf, Christopher. "Mobile Security Catching Up? Revealing the Nuts and Bolts of the Security of Mobile Devices". 2011 IEEE Symposium on Security and Privacy. http://ieeexplore.ieee.org/stamp/stamp.jsp?arnumber=5958024.
Chinese Patent Application No. 201580053748.0, Office Action dated Nov. 22, 2019, 5 pages.
Chinese Patent Application No. 201580071180.5, Office Action dated Nov. 5, 2019, 10 pages.
European Search Report for European Application No. 15/846605.2 dated Mar. 7, 2018, 8 pages.
European Search Report for European Application No. 15864731.3 dated Mar. 2, 2018, 11 pages.
Final Office Action for U.S. Appl. No. 13/796,550, dated Jan. 12, 2018, 36 pages.
Decker, Christian; Nguissi, Serge; Haller, Jochen; Kilian-Kehr, Roger. Proximity as a Security Property in a Mobile Enterprise Application Context. Proceedings of the 37th Annual Hawaii International Conference on System Sciences, 2004. http://ieeexplore.ieee.org/stamp/stamp.jsp?arnumber=1265451.
European Application No. 15858274.2, Supplementary European Search Report dated Jul. 14, 2018, 9 pages.
European Patent Application No. 15846605.2, Office Action dated Jan. 15, 2020, 7 pages.
Kyungwhan Park et al: "Smartphone remote lock and wipe system with integrity checking of SMS notification", Consumer Electronics (ICCE), 2011 IEEE International Conference on, IEEE, Jan. 9, 2011 (Jan. 9, 2011), pp. 263-264.
Lee, et al., "A New Delegation-Based Authentication Protocol for Use in Portable Communication Systems", IEEE Transactions on Wireless Communications, vol. 4, No. 1, Jan. 2005, pp. 57-64.
U.S. Appl. No. 14/795,850, Office Action dated Oct. 31, 2018, 19 pages.
U.S. Appl. No. 14/795,850, Office Action dated Nov. 1, 2018, 19 pages.
R, Vijayendra; K, Srinivasa G. Identifying Objects Using RF Transmitters and Receivers, and Retrieving Data Using GSM. 2010 The 2nd International Conference on Computer and Automation Engineering (ICCAE). http://ieeexplore.ieee.org/stamp/jsp?arnumber=5451944.
U.S. Appl. No. 14/795,850, Final Office Action dated Mar. 28, 2019, 21 pages.
U.S. Appl. No. 14/569,531, Notice of Allowance dated Sep. 13, 2017, 47 pages.
U.S. Appl. No. 14/569,531, Notice of Allowance dated Jun. 29, 2017, 47 pages.
U.S. Appl. No. 14/795,850, Notice of Allowance dated May 1, 2020, 60 pages.

* cited by examiner ated anti-theft protection disablement at a customer
ANTI-THEFT RECOVERY TOOL

CROSS REFERENCE TO RELATED PATENT APPLICATION

This application is a continuation of U.S. application Ser. No. 14/795,850, filed on Jul. 9, 2015, and titled "ANTI-THEFT RECOVERY TOOL," which claims the benefit of U.S. Provisional Application No. 62/086,079, filed Dec. 1, 2014, and titled "ANTI-THEFT RECOVERY TOOL," which are herein incorporated by reference in their entirety.

BACKGROUND

Anti-theft functionalities for mobile communication devices are intended to render the features on the devices inoperable to unauthorized users when the devices are lost or stolen. For example, the anti-theft functionalities on a mobile communication device may prevent a user from resetting the hardware of the mobile communication device to a default factory setting unless the proper anti-theft protection credential is supplied to the anti-theft functionalities. The proper credential may include an authentication credential that is inputted by an authorized user during an initial configuration of the mobile communication device. Accordingly, the anti-theft functionalities may prevent a malicious person from hardware resetting a lost or stolen mobile communication device to a default factory setting, and then bartering or selling the device as an unencumbered device to an unsuspecting third-party.

However, the anti-theft functionalities may in some instances have unintended consequences. For example, authorized users who desire to hardware reset mobile communication devices for legitimate purposes, such as to recover from a software error, may forget their anti-theft protection credentials. As a result, customer care calls from authorized users who find themselves in such a situation may create additional work and expense for a telecommunication carrier. In addition, telecommunication carriers who operate trade-in programs may receive mobile communications devices that cannot be properly reset for secondary sales due to the failures of authorized users to disable anti-theft functionalities prior to trading in their devices.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
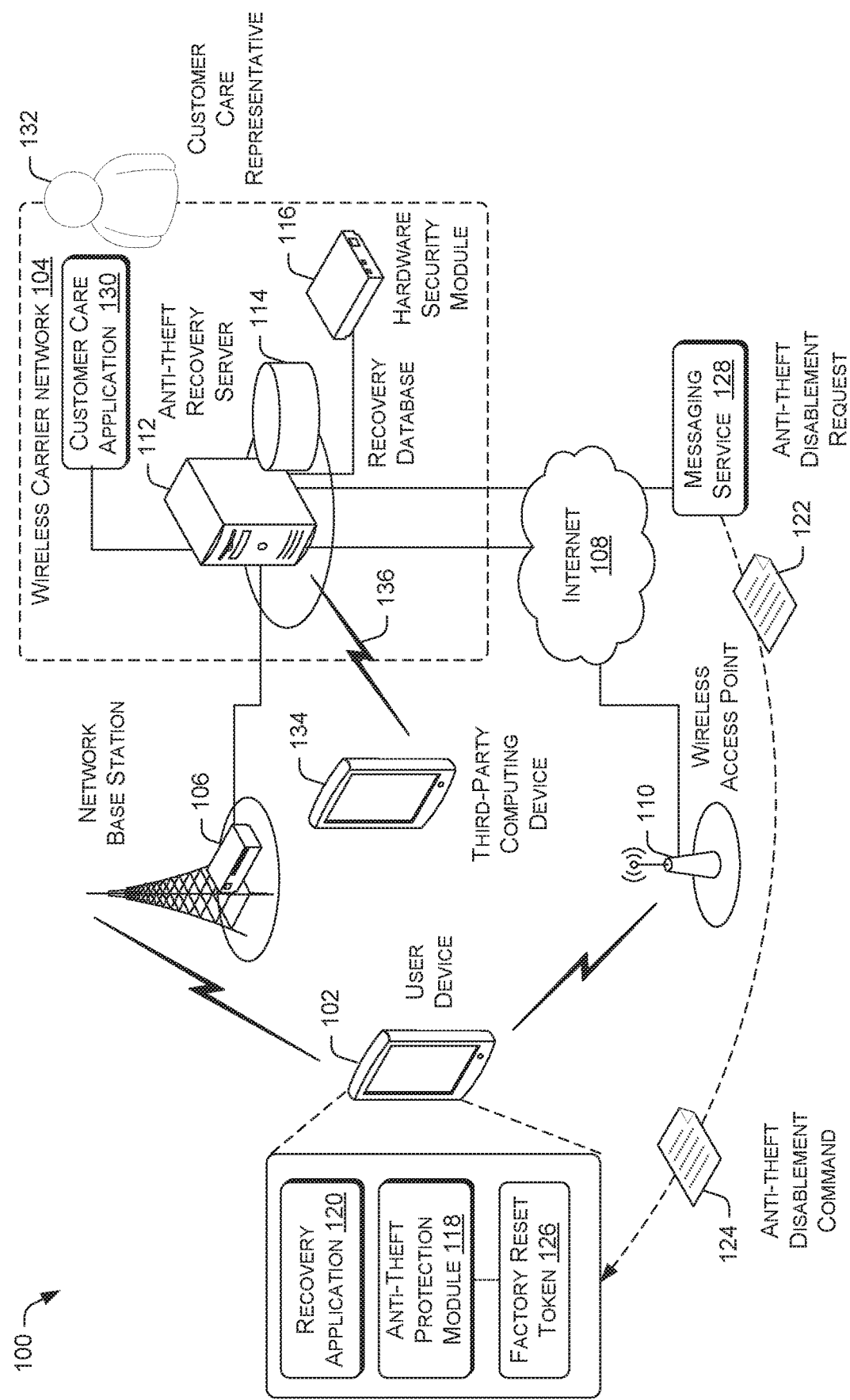
FIG. 1 illustrates an example network architecture for an anti-theft recovery tool that is used to disable anti-theft protection for a device hardware reset.

This disclosure is directed to techniques for providing an anti-theft protection disablement solution to authorized users and authorized customer service representatives. A user device may be configured to request an anti-theft protection credential upon receiving a request to reset to a factory default setting as a part of its anti-theft functionalities. Alternatively, the user device may request an anti-theft protection credential during a subsequent device setup initiated by a reset to the factory default setting. For instance, the anti-theft protection credential may be a password, a personal identification number (PIN), a passphrase, etc. Accordingly, the user device may perform the reset or complete the subsequent device setup when the proper anti-theft protection credential is received. In various embodiments, the anti-theft protection disablement solution may disable the anti-theft functionalities, so that an authorized user or a customer service representative is able to perform the reset of the user device without inputting the anti-theft protection credential.

As a part of the disablement solution, a customer using the user device may be validated by a recovery application on the user device or by a customer service representative at a call center as an authorized user of the device. The validation may be performed using alternative authentication credentials or authentication information provided by the user. Upon validation, an anti-theft disablement request may be initiated by the recovery application or via a customer care application used by the customer service representative. The anti-theft disablement request may be authenticated by an anti-theft recovery server of a wireless communication carrier. Subsequently, the anti-theft recovery server may send an anti-theft disablement command to the user device. The command may cause the user device to disable its anti-theft protection functionalities, and reset to a factory default setting without the input of an anti-theft protection credential.

In some instances, the anti-theft recovery server may communicate with a recovery application on a user device via an intermediary service, such as a cloud messaging service or a binary messaging service. The cloud messaging service and the binary messaging service may be permitted by the anti-theft functionalities on the user device to operate because such services do not surface any data via a device user interface. Thus, the data cannot be viewed or manipulated by a user of the user device. In other instances, the anti-theft recovery server may receive an anti-theft disablement request from a customer care application. The anti-theft disablement request may be initiated by a customer service representative after the customer service representative has verified that the user is an authorized user.

In additional instances, the anti-theft recovery server may transmit an anti-theft disablement command to a third-party computing device. The anti-theft disablement command may be a one-time use command. The anti-theft disablement command may contain coded information that directs the anti-theft functionalities of the user device to be disabled. The anti-theft recovery server may transmit such a command upon a request from a trusted administrative party or upon a request from a user that is validated to be an authorized user of the user device. Subsequently, the third-party computing device may deliver the anti-theft disablement command to the user device. In such instances, the third-party computing device may deliver the data via a communication connection between the third-party computing device and the user device. Alternatively, the third-party computing device may formulate the anti-theft disablement command into a machine-readable image that is presented by the third-party computing device. The machine-readable image is then visually captured by the user device and decoded into the anti-theft disablement command. The anti-theft disablement command is processed by the user device to disable the anti-theft functionalities of the user device.

The techniques may enable an authorized user to disable the anti-theft functionalities of a user device without contacting customer service in instances in which the authorized user has forgotten the anti-theft protection credential. Accordingly, the techniques may reduce the number of customer service calls that are placed to the customer support center of a telecommunication carrier. Additionally, the techniques may enable a telecommunication carrier to perform reset of user devices that are traded in with active anti-theft functionalities without knowledge of the corresponding anti-theft protection credentials. Thus, the techniques may reduce overhead and increase revenue for the telecommunication carrier. The techniques described herein may be implemented in a number of ways. Example implementations are provided below with reference to the following figures.

Example Network Architecture

FIG. 1 illustrates an example network architecture 100 for an anti-theft recovery tool that is used to disable anti-theft protection for a device hardware reset. The architecture 100 may include a user device 102 and a wireless carrier network 104. The wireless carrier network 104 may be operated by a wireless communications carrier. The wireless carrier network 104 may include base stations, such as the base station 106, as well as a core network. The base stations may be a part of the access network structure of the wireless carrier network 104. The base stations are responsible for handling voice and data traffic between user devices, such as the user device 102 and the core network. Alternatively, the user device 102 may access the core network via other communication networks of the wireless communication carrier, third-party providers that connect to the core network, or the Internet 108. For instance, the user device 102 may access the core network via a wireless access point 110, in which the access point connects to the wireless carrier network 104 through the Internet 108. The ability of the user device 102 to access the core network of the wireless carrier network 104 via a wireless access point may be advantageous in some situations. For example, the user device 102 may use the wireless access point when no base stations are available to provide access to the core network.

The core network may provide telecommunication and data communication services to the user devices. For example, the core network may connect the user device 102 to other telecommunication and data communication networks. In various embodiments, the core network of the wireless carrier network 104 may be equipped with an anti-theft recovery server 112, a recovery database 114, and a hardware security module 116.

The user device 102 may be a smartphone, a tablet computer, or any other device that is capable of obtain telecommunication and/or data communication services from the wireless carrier network 104. The user device 102 may include an anti-theft protection module 118 and a recovery application 120. The anti-theft protection module may provide anti-theft functionalities to the user device 102. The anti-theft functionalities may prevent an unauthorized person from accessing specific features of the user device, as well as prevent the unauthorized person from accessing certain data stored on the user device. For example, the anti-theft functionalities may prevent a user from resetting the user device to a default factory setting unless the user enters an anti-theft protection credential. In some embodiments, the anti-theft protection module 118 may be an integral component of an operating system or firmware executing on the user device 102. However, in other embodiments, the anti-theft protection module 118 may be a supplemental application executing on the user device 102.

The recovery application 120 may trigger the anti-theft protection module 118 to turn off the anti-theft protection functionalities that the module provides to the user device 102. In operation, the recovery application 120 may initially register the user device 102 with the anti-theft recovery server 112. Subsequently, the recovery application 120 may, after validating a user as an authorized user, send an encrypted anti-theft disablement request 122 to the anti-theft recovery server. In turn, the anti-theft recovery server 112 may decrypt the encrypted anti-theft disablement request 122 using the hardware security module 116. After further authenticating the decrypted anti-theft disablement request as valid, the anti-theft recovery server 112 may verify that the user device 102 is eligible for anti-theft protection disablement. The anti-theft recovery server 112 may perform such authentication and verification using information that is stored in the recovery database 114.

Thus, assuming that the eligibility of the user device 102 is verified, the anti-theft recovery server 112 may send a response message that includes an anti-theft disablement command 124 to the user device 102. The response message may be validated by the recovery application 120 following receipt. Subsequently, the anti-theft disablement command 124 in the validated response message may be applied by the recovery application 120 to disable the anti-theft functionalities provided by the anti-theft protection module 118. For example, the recovery application 120 may clear a factory reset token 126 of the anti-theft protection module 118. The factory reset token 126 may be configured to control whether a reset or a subsequent associated device set up initiated by the reset can be performed without the input of anti-theft protection credentials into the anti-theft protection module 118. Thus, the clearing of the factory reset token 126 may enable the reset to be performed without input of the anti-theft protection credential.

In various embodiments, the user device 102 may use a messaging service 128 to exchange messages with the anti-theft recovery server 112. The messages exchanged may include the anti-theft disablement request and the anti-theft disable command. In some instances, the messaging service 128 may be a cloud messaging service that is provided by the wireless carrier network 104 or a third-party operator, such as Google Cloud Messaging (GCM). In such instances, the messaging service 128 may provide message service registration identifiers to recovery applications, e.g., the recovery application 120. The registration identifiers may be further used by the anti-theft recovery server 112 to verify the source authenticity of anti-theft disablement requests. In other instances, the messaging service 128 may be a binary Short Message Service (SMS). The messaging service 128 may be permitted by the anti-theft protection module 118 on the user device 102 to operate because such services do not surface any data that can be viewed or manipulated by a user of the user device 102. The messaging service 128 may be implemented using servers, network interfaces, data processing and message delivery software, and/or so forth.

In additional embodiments, the anti-theft disablement request 122 for the user device 102 may be initiated at a customer care application 130. The customer care application 130 may be executed by a computing device that is under the control of a telecommunication carrier, such as a computing device that communicates with a core network of the wireless carrier network 104. A customer care representative 132 may initiate the anti-theft disablement request 122 using the customer care application 130 after receiving a plea from an authorized user of the user device 102. Alternatively, the customer care representative 132 may initiate the anti-theft disablement request 122 for the user device 102 when the device is traded in to a wireless communication carrier or otherwise transferred to the possession of the wireless communication carrier.

In further embodiments, the anti-theft recovery server 112 may transmit the anti-theft disablement command 124 to a third-party computing device 134 via a communication connection 136. The anti-theft disablement command 124 may be a one-time use command. The anti-theft disablement command 124 may contain coded information that directs the recovery application 120 to disable specific anti-theft functionalities of the user device 102, so that the reset of the user device 102 may be performed without the input of anti-theft protection credentials of the user. The anti-theft recovery server 112 may transmit such a command upon a request from a trusted administrative party or upon a request from a user that is validated to be an authorized user of the user device 102. Subsequently, the third-party computing device 134 may deliver the anti-theft disablement command 124 to the user device 102.

In such embodiments, the third-party computing device 134 may deliver the command via a communication connection between the third-party computing device 134 and the user device 102. Alternatively, the third-party computing device 134 may formulate the anti-theft disablement command 124 into a machine-readable image that is presented by the third-party computing device 134. The machine-readable image is then visually captured by the user device 102 via a camera and decoded into the anti-theft disablement command 124. The anti-theft disablement command 124 is then processed by the user device 102 to disable the anti-theft functionalities of the user device 102.

Example User Device Components

Figure 2:
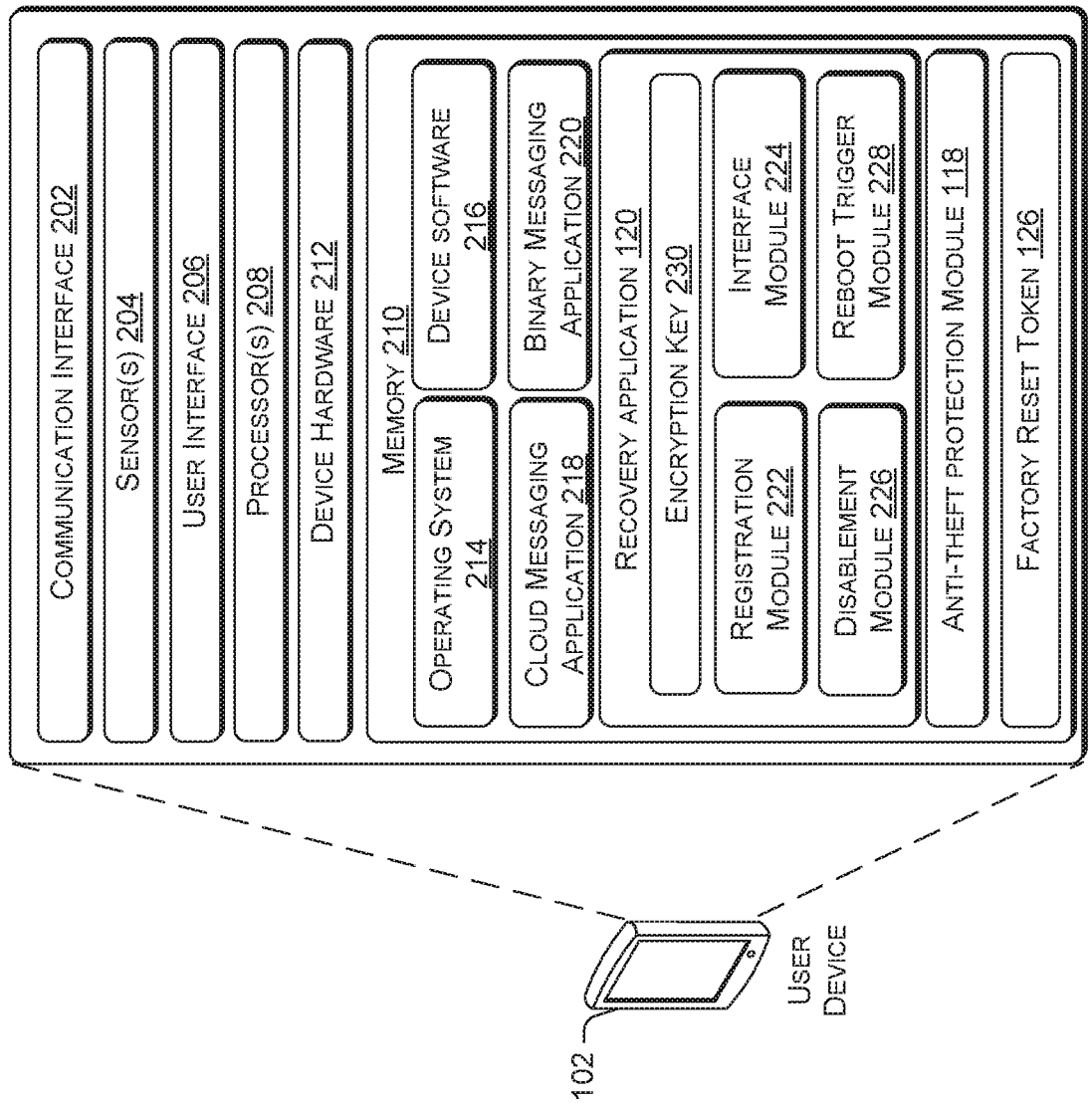
FIG. 2 is a block diagram showing various components of an illustrative user device that supports the anti-theft recovery tool.

FIG. 2 is a block diagram showing various components of an illustrative user device that supports the anti-theft recovery tool. The user device 102 may include a communication interface 202, one or more sensors 204, user interface 206, one or more processors 208, memory 210, and other device hardware 212.

The communication interface 202 may include wireless and/or wired communication components that enable the user device to transmit or receive voice or data communication via the wireless carrier network 104, as well as other telecommunication and/or data communication networks. The sensors 204 may include a proximity sensor, a compass, an accelerometer, and/or a global positioning system (GPS) sensor. The proximity sensor may detect movement of objects that are proximate the user device 102. The compass, the accelerometer, and the GPS sensor may detect orientation, movement, and geolocation of the user device 102.

The user interface 206 may enable a user to provide inputs and receive outputs from the user device 102. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. The memory of the user device 102 may store device identification information. For example, device identification information may include International Mobile Station Equipment Identity (IMEI) information.

The device hardware 214 may include other hardware that is typically located in a mobile telecommunication device. For example, the device hardware 214 may include signal converters, antennas, cameras, hardware decoders and encoders, graphic processors, a SIM card slot, and/or the like that enable the user device 102 to execute applications and provide telecommunication and data communication functions. A subscriber identity module (SIM) card may be inserted into the SIM card slot of the user device 102. The SIM card may contain subscriber identification information and a SIM carrier code. Accordingly, the SIM card may enable the user device 102 to obtain telecommunication and/or data communication services from the wireless communication carrier that is identified by the SIM carrier code.

The one or more processors 208 and the memory 210 of the user device 102 may implement an operating system 214, device software 216, a cloud messaging application 218, a binary messaging application 220, the recovery application 120, and the anti-theft protection module 118. The software, applications, and modules may include routines, program instructions, objects, and/or data structures that perform particular tasks or implement particular abstract data types.

The operating system 214 may include components that enable the user device 102 to receive and transmit data via various interfaces (e.g., user controls, communication interface 202, and/or memory input/output devices). The operating system 214 may also process data using the one or more processors 208 to generate outputs based on inputs that are received via the user interface 206. For example, the operating system 214 may provide an execution environment for the execution of the cloud messaging application 218 and the binary messaging application 220. The operating system 214 may include a presentation component that presents the output (e.g., display the data on an electronic display, store the data in memory, transmit the data to another electronic device, etc.).

The operating system 214 may include an interface layer that enables applications to interface with the communication interface 202. The interface layer may comprise public APIs, private APIs, or a combination of both public APIs and private APIs. Additionally, the operating system 214 may include other components that perform various other functions generally associated with an operating system. The device software 216 may include software components that enable the user device to perform functions. For example, the device software 216 may include basic input/output system (BIOS), bootrom, or a bootloader that boots up the user device 102 and executes the operating system 214 following power up of the device.

The cloud message application 218 may enable the user device 102 to communicate with the anti-theft recovery server 112 via a cloud messaging service. For example, the cloud message application 218 may include modules that form secure communication connections with the messaging service 128, modules for transmitting data to the messaging service 128 according to standard protocols, as well as modules that perform other functions related to cloud messaging. For instance, the cloud messaging application 218, under the control of the recovery application 120, may request a unique message service registration identifier from the messaging service 128. The unique message service registration identifier is subsequently used by the recovery application 120 to obtain services from the messaging service 128. The binary messaging application 220 may enable the user device 102 to communicate with the anti-theft recovery server 112 via a binary messaging service, such as binary SMS. Accordingly, the binary messaging application 220 may include modules that form communication connections with the messaging service 128, modules for transmitting data to the messaging service 128 according to standard protocols, as well as modules that perform other functions related to binary messaging.

Other applications that provide utility, entertainment, and/or productivity functionalities to a user of the user device 102 may be stored in the memory 210. For example, these applications may include telephony applications, electronic mail applications, remote desktop applications, web browser applications, navigation applications, office productivity applications, multimedia streaming applications, and/or so forth.

The one or more processors 208 and the memory 210 of the user device 102 may further implement the recovery application 120. The recovery application 120 may include a registration module 222, an interface module 224, a disablement module 226, and a reboot trigger module 228. The registration module 222 may register the recovery application 120 with a cloud messaging service via the cloud messaging application 218 or the binary messaging application 220. Such registration may enable the recovery application 120 to send data to and receive data from the anti-theft recovery server 112. As a result of the registration, the recovery application 120 may receive a message service registration identifier from the messaging service 128. Subsequently, each message that is sent or received by the cloud messaging application 218 or the binary messaging application 220 may be marked with the message service registration identifier.

The registration module 222 may also register the user device 102 with the anti-theft recovery server 112. Such registration may enable the anti-theft recovery server 112 to send an anti-theft disablement command to the user device 102. During the registration, the registration module 222 may send a registration message that includes a device identifier of the user device 102 and a message service registration identifier to the anti-theft recovery server 112. For example, the device identifier may be an IMEI of the user device 102. The message service registration identifier is the identifier that is assigned to the recovery application 120 by the messaging service 128. In turn, the anti-theft recovery server 112 may store the identifiers for subsequent authentication of anti-theft protection disablement requests from the device.

The interface module 224 may generate the messages that are exchanged between the user device 102 and the anti-theft recovery server 112. For example, the interface module 224 may generate an anti-theft disablement request based on user input received via the user interface 206. Accordingly, the interface module 224 may provide user interface environments that receive user anti-theft protection disablement requests and display request outcomes and messages. In various embodiments, the interface module 224 may format a message to be delivered to the anti-theft recovery server 112 with a corresponding identification information. The identification information may include a type of the message, a length of the message, a time stamp of the message, a recovery session identifier, a message authentication code (MAC), and/or so forth. The interface module 224 may also validate a message that is received from the anti-theft recovery server 112 base on such identification information of the message.

In various embodiments, the interface module 224 may further encrypt the messages that are transmitted to the anti-theft recovery server 112. The messages may be encrypted with an encryption key 230 that is stored in the memory 210 of the user device 102. The encryption key 230 may be a public key of a public-private key pair that is provided by the hardware security module 116 for the user device 102. The private key of the public-private key pair may be stored by the anti-theft recovery server 112 in the recovery database 114 for the user device 102. The private key may be used by the anti-theft recovery server 112 to decrypt messages that are received from the user device 102, as well as digital sign messages that are transmitted to the user device 102. Thus, the interface module 224 may further validate messages that are received from the anti-theft recovery server 112 via the authentication information of the receive messages, such as a MAC of a message that is generated using a session identifier. For example, the interface module 224 may validate a Hash-based Message Authentication Code (HMAC) of a received message via the encryption key 230 and a hashing algorithm.

The interface module 224 may use the cloud messaging application 218 or the binary messaging application 220 to send and receive the messages that are exchanged between the user device 102 and the anti-theft recovery server 112. In order to handle the sending and receiving of messages, the interface module 224 may perform checks to verify that the messaging applications on the user device 102 are properly configured to support the transmission of messages. Alternatively, the interface module 224 may receive a message from the third-party computing device via a communication connection between the devices or via a camera of the user device 102 as a machine-readable image. The machine-readable image may be a two-dimensional code, such as a QR® code, an Aztec code, a MaxiCode, or another code that is indecipherable to a human user.

In various embodiments, the interface module 224 may have the ability to authenticate that a user is an authorized user of the user device 102. For example, the interface module 224 may use a user interface screen to prompt a user to input alternative authentication credentials. The alternative authentication credentials may be credentials other than the anti-theft protection authentication credential. For example, an alternative authentication credential may be an account password that user has with the telecommunication carrier. The interface module 224 may verify the inputted alternative authentication credentials against authentication credentials stored in an internal credential store or an online credential store. Thus, the interface module 224 may send an anti-theft protection disablement request to the anti-theft recovery server 112 if the alternative authentication credential are verifiable against the stored authentication credentials.

The disablement module 226 may receive validated anti-theft protection disablement commands from the interface module 224. An anti-theft protection disablement command may be applied by the disablement module 226 to disable one or more anti-theft protection functionalities provided by the anti-theft protection module 118. For example, the disablement module 226 may clear a factory reset token 126 of the anti-theft protection module 118. The factory reset token 126 may be configured to control whether a reset can be performed without the input of anti-theft protection credentials into the anti-theft protection module 118. Thus, the clearing of the factory reset token 126 may enable the reset to be performed without input of the anti-theft protection credential.

The reboot trigger module 228 may trigger a reboot of the user device 102. In various embodiments, the disablement module 226 may use the reboot trigger module 228 to trigger a reboot after one or more anti-theft protection functionalities provided by the anti-theft protection module 118 is disabled and factory default reset is initialized. According, the reboot of the user device 102 may cause the device to enter into a factory default state. Additional details regarding the functionalities of the recovery application 120 are discussed in the context of FIGS. 4-10. Thus, the recovery application 120 may include other modules that perform the functionalities described in the context of these figures.

Example Anti-theft Recovery Server Components

Figure 3:
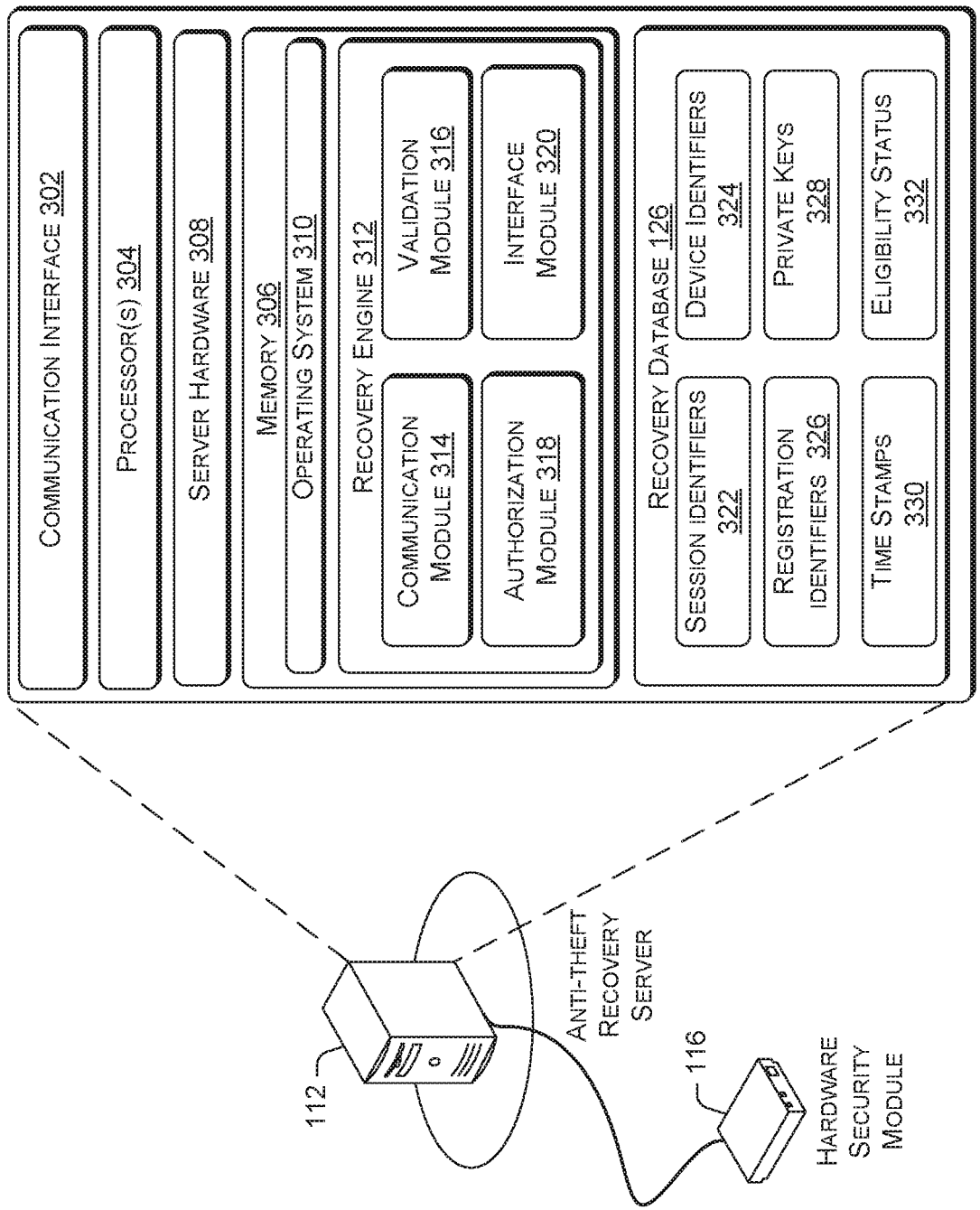
FIG. 3 is a block diagram showing various components of an illustrative anti-theft recovery server that remotely disables anti-theft protection for a device.

FIG. 3 is a block diagram showing various components of an illustrative anti-theft recovery server 112 that remotely disables anti-theft protection for a device. The anti-theft recovery server 112 may include a communication interface 302, one or more processors 304, memory 306, and server hardware 308. The communication interface 302 may include wireless and/or wired communication components that enable the server to transmit data to and receive data from other networked devices. The server hardware 308 may include additional hardware that performs user interface, data display, data communication, data storage, and/or other server functions.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 304 and the memory 306 of the anti-theft recovery server 112 may implement an operating system 310 and a recovery engine 312. The operating system 310 may include components that enable the anti-theft recovery server 112 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The recovery engine 312 may include a communication module 314, a validation module 316, an authorization module 318, and an interface module 320. The communication module 314 may receive messages that originate from user devices, such as the user device 102, and send messages to the user devices. In various embodiments, the messages may be sent and received via the messaging service 128. The communication module 314 may decrypt messages that are encrypted via public keys of user devices using corresponding private keys that are stored in the recovery database 114. The communication module 314 may use the hardware security module 116 to perform such decryption. For example, user devices of a particular model type may use a particular public key to encrypt their messages. Accordingly, the communication module 314 may decrypt a message using a corresponding private key that correlates with the particular model of the user device that sent the message. In another example, each user device may be assigned a unique public key, and the communication module 314 may retrieve a corresponding private key from the recovery database 114 to decrypt the message. Conversely, the communication module 314 use the private key that corresponds to a user device to generate a digital signature for a message that intended for the user device. For example, the communication module 314 may use a hashing algorithm and private keys to generate HMACs for messages intended for delivery to user devices. Such messages may include device registration messages, anti-theft protection disablement messages, anti-theft protection status messages, disablement error messages, and/or so forth.

The validation module 316 may be employed by the communication module 314 to authenticate messages that are received from user devices, such as the user device 102. In various embodiments, a received message from a user device may be validated based on the message type and the length of the message. In various embodiments, the message types may include a registration request type, a registration response type, an anti-theft protection disablement request type, an anti-theft protection disablement command type, an anti-theft protection disablement completion type, an error message type, etc. For example, a message having the registration request type is a message that registers a user device for the anti-theft disablement. A message having the registration response type is a message that is received by the user device indicating successful registration for the anti-theft disablement.

Further, a message having the anti-theft protection disablement request type is a request for anti-theft disablement. A message having the anti-theft protection disablement command type is an anti-theft protection disablement command. A message having the anti-theft protection disablement completion type is a message that confirm anti-theft protection disablement is completed by a user device. A message having the error message type may provide an error indication, such as an indication that the user device is ineligible for anti-theft protection disablement.

The validation module 316 may further validate a received message by verifying that a message service registration identifier, a recovery session identifier, and/or a device identifier of the user device associated with the message matches information that are stored in the recovery database 114.

The authorization module 318 may register each user device for anti-theft protection recovery upon receiving a registration request. The registration of a user device may involve storing the device identifier and message service registration identifier of the user device in the recovery database 114. Following registration, the user device may become eligible for remote anti-theft protection disablement by the recovery engine 312. Subsequently, when an anti-theft protection disablement request is received from a user device, the authorization module 318 may determine whether the user device is eligible for anti-theft protection disablement based on eligibility information stored in the recovery database 114. A user device may be designated as ineligible for anti-theft protection disablement for various reasons. For example, the user device may become ineligible if the device is reported lost or stolen. In another example, the user device may become ineligible if the user of the device fails to make one or more timely payments of fees due to the telecommunication carrier that operates the wireless carrier network 104. Accordingly, the authorization module 318 may provide user interface environments that enables an administrator to modify the eligibility status of a user device.

The interface module 320 may enable the recovery engine 312 to receive inputs and provide outputs to the customer care application 130. In this way, the customer care representative 132 may request anti-theft protection disablement for a user device, verify the eligibility of a user device for anti-theft protection disablement, and receive information regarding the success or failure of anti-theft protection disablement requests. Likewise, the interface module 320 may further enable the recovery engine 312 to interact with the third-party computing device 134. In various instances, the interface module 320 may transmit an anti-theft protection disablement command that is intended for the user device 102 to the third-party computing device 134. The anti-theft protection disablement command may be in the form of a digital payload that can be delivered electronically to the user device 102. Alternatively, the anti-theft protection disablement command may be delivered to the third-party computing device 134 as a machine-readable code for presentation on a screen of the device, which is then captured by a camera on the user device 102.

The recovery database 114 may store information that determines whether a user device is entitled to receive anti-theft protection disablement. The recovery database 114 may include one or more databases, such as relational databases, object databases, object-relational databases, and/or key-value databases that store such information for the user devices. In various embodiments, the information may include session identifiers 322, device identifiers 324, registration identifiers 326, private keys 328, time stamps 330, and eligibility statuses 332. Additional details regarding the functionalities of the recovery engine 312 and the information stored in the recovery database 114 are discussed in the context of FIGS. 4-10. Thus, the recovery engine 312 may include other modules that perform the functionalities described in the context of these figures.

Example Processes

FIGS. 4-10 present illustrative processes 400-1000 for providing anti-theft protection disablement for user devices. Each of the processes 400-1000 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-1000 are described with reference to the architecture 100 of FIG. 1.

Figure 4:
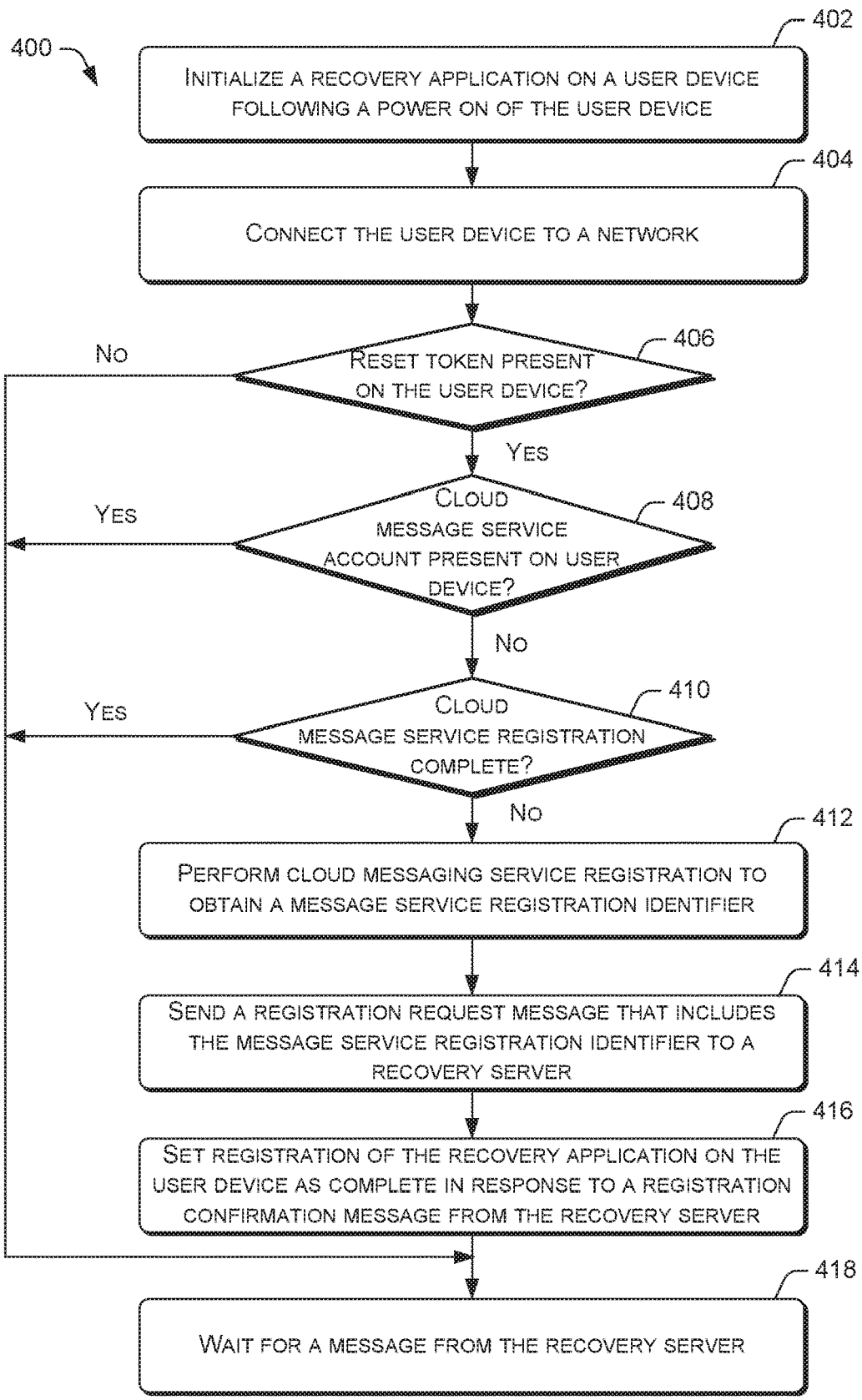
FIG. 4 is a flow diagram of an example process for initializing a recovery application on a user device that performs anti-theft protection disablement.

FIG. 4 is a flow diagram of an example process 400 for initializing a recovery application on a user device that performs anti-theft protection disablement. At block 402, the recovery application 120 on the user device 102 may be initiated following a power on of the user device 102. In various embodiments, the recovery application 120 may be preloaded on the user device 102 as a part of a system image. The recovery application 120 may include the encryption key 230 that is generated from the hardware security module 116.

At block 404, the user device 102 may connect to a communication network. In some embodiments, the user device 102 may connect to the wireless carrier network 104 via a network base station. In other embodiments, the user device 102 may connect to the Internet via a wireless access point, in which the Internet may provide the user device 102 with access to the wireless carrier network 104.

At decision block 406, the recovery application 120 may determine whether the factory reset token 126 is present on the user device 102. In various embodiments, the presence of the factory reset token 126 on the user device may indicate that anti-theft protection module 118 of the user device 102 is configured to request an input of anti-theft protection credentials prior to permitting a reset of the user device 102 to a default factory setting. Alternatively, the presence of the factory reset token 126 may indicate that the anti-theft protection module 118 is configured to request an input of anti-theft protection credentials during a subsequent device setup initiated by a reset to the factory default setting. Thus, if the recovery application 120 determines that the factory reset token 126 is present ("yes" at decision block 406), the process 400 may proceed to decision block 408.

At decision block 408, the recovery application 120 may determine whether a cloud messaging service account is present on the user device 102. The cloud messaging service account may be an account that is established to use the cloud messaging application 218. Thus, if the recovery application 120 determines that no cloud messaging service account is present on the user device 102 ("no" at decision block 408), the process 400 may proceed to decision block 410.

At decision block 410, the recovery application 120 may determine whether the registration of the user device 102 with the cloud messaging service is completed. The registration of the user device 102 enables the device to send messages to and receive messages from the anti-theft recovery server 112 via the cloud messaging service. Accordingly, if the recovery application 120 determines that the registration of the user device 102 is incomplete ("no" at decision block 410), the process 400 may proceed to block 412.

At block 412, the recovery application 120 may perform messaging service registration with the cloud messaging service to obtain a cloud message service registration identifier. The registration may be performed using the cloud messaging application 218.

At block 414, the recovery application 120 may send a registration request message to the anti-theft recovery server 112. The registration request message may include the cloud message service registration identifier. In turn, the anti-theft recovery server 112 may store the message service registration identifier in the recovery database 114. Subsequently, the anti-theft recovery server 112 may send a registration confirmation message to the user device 102 to indicate that registration of the recovery application 120 is complete.

At block 416, the recovery application 120 may set the registration as complete in response to the registration confirmation message from the anti-theft recovery server 112. In various embodiments, the recovery application 120 may indicate that the registration is complete by setting a registration complete flag value.

At block 418, the recovery application 120 may wait for a message from the anti-theft recovery server. In various embodiments, the message may be transmitted to the user device 102 via a cloud messaging service or a binary messaging service. The message may be a command from the anti-theft recovery server 112 to disable an anti-theft functionality provided by the anti-theft protection module 118. The disablement of the anti-theft functionality may mean that a reset of the user device 102 may be performed without the input of an anti-theft protection credential.

Returning to decision block 406, if the recovery application 120 determines that the reset token is not present on the user device 102 ("no" at decision block 406), the process 400 may proceed directly to block 418. Likewise, returning to decision block 408, if the recovery application 120 determines that a cloud messaging service account is present on the user device ("yes" at decision block 406), the process 400 may proceed to directly to block 418. Further, returning to decision block 408, if the recovery application 120 determines that cloud message service registration is complete ("yes" at decision block 408), the process 400 may proceed to directly to block 418.

Figure 5:
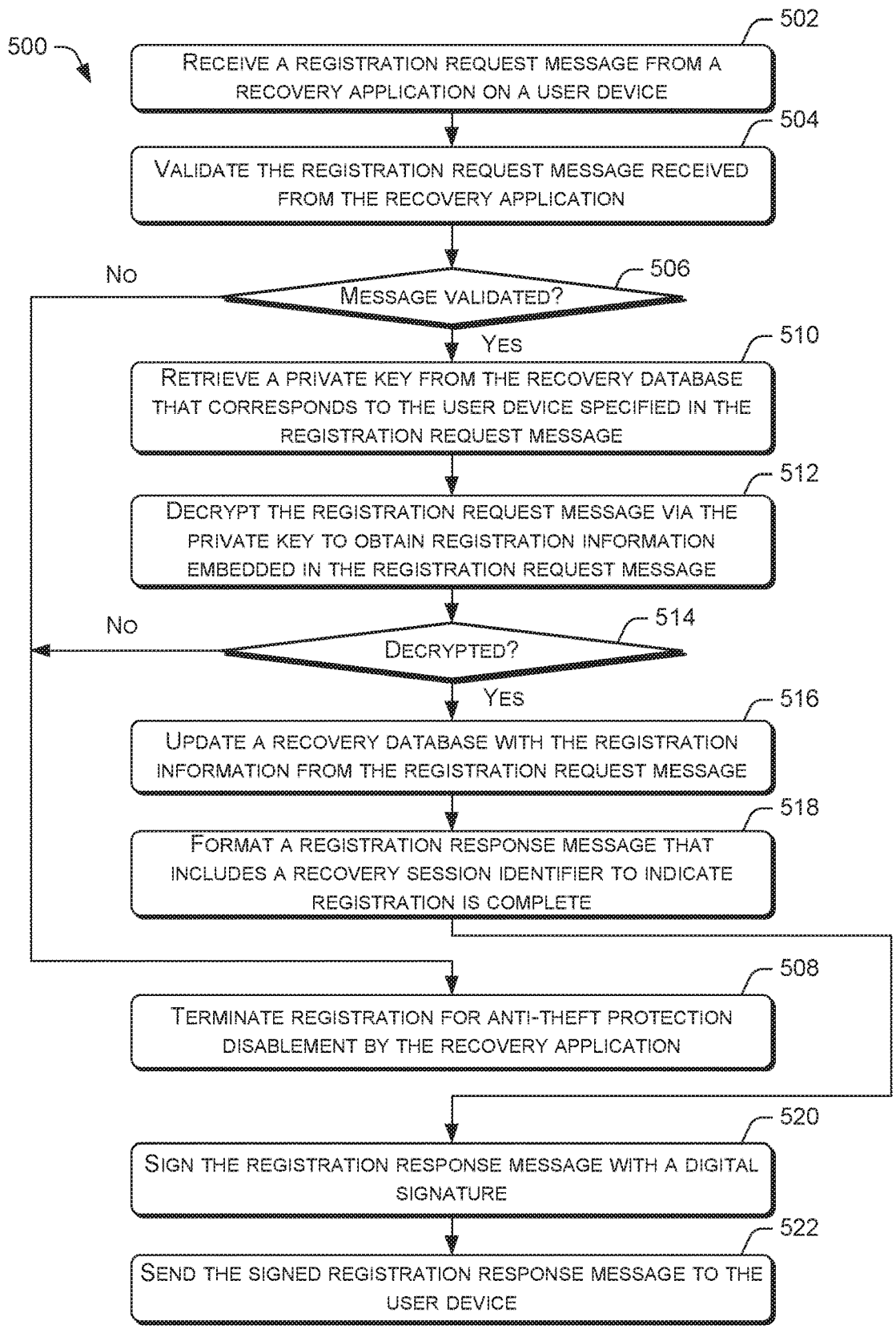
FIG. 5 is a flow diagram of an example process for registering a recovery application that preforms anti-theft protection disablement with an anti-theft recovery server.

FIG. 5 is a flow diagram of an example process 500 for registering the recovery application that performs anti-theft protection disablement with an anti-theft recovery server. At block 502, the anti-theft recovery server 112 may receive a recovery application registration request message from the recovery application 120 on the user device 102. The message may be received via the messaging service 128 from the user device 102. In various embodiments, the messaging service 128 may be a cloud messaging service or a binary messaging service.

At block 504, the anti-theft recovery server 112 may validate the registration request message. In various embodiments, the anti-theft recovery server 112 may perform the validation based at least on a message type and a message length parsed from the message. For example, the anti-theft recovery server 112 may verify that a type identifier of the registration request message indicates that the message is of a type that may be processed by the anti-theft recovery server 112. Alternatively or concurrently, the anti-theft recovery server 112 may parse embedded message length information from the registration request message. Accordingly, the anti-theft recovery server 112 may determine that the message is valid when the actual number of message bytes received matches the message length information from the registration request message.

At decision block 506, if the anti-theft recovery server 112 determines that the message is not validated ("no" at decision block 506), the process 500 may proceed to block 508. At block 508, the anti-theft recovery server 112 may terminate the registration for anti-theft protection disablement by the recovery application.

However, if the anti-theft recovery server 112 determines that the message is validated ("yes" at decision block 506), the process 500 may proceed to block 510. At block 510, the anti-theft recovery server 112 may retrieve a private key from the recovery database 114 that corresponds to the user device 102 specified in the message. In various embodiments, the registration request message may include a device identifier (e.g., IMEI) or a model code (e.g., type allocation code), and the anti-theft recovery server 112 may retrieve a private key that corresponds to the device identifier or model code.

At block 512, the anti-theft recovery server 112 may decrypt the registration request message with the private key to obtain registration information embedded in the message. The decryption of the message using the private key may be performed by the hardware security module 116. In various embodiments, the registration information may include the registration session identifier of the registration request message, a time stamp of the registration message, the IMEI of the user device 102, a message service registration identifier, and/or size information for the message service registration identifier.

At decision block 514, the anti-theft recovery server 112 may determine whether the registration request message is decrypted or if an error occurred during the decryption. Thus, if the anti-theft recovery server 112 determines that an error occurred during the decryption ("no" at decision block 514), the process 500 may loop back to block 508. Once again, the anti-theft recovery server 112 may terminate the registration for anti-theft protection disablement by the recovery application at block 508. However, if the anti-theft recovery server 112 determines that the registration request message is decrypted ("yes" at decision block 514), the process 500 may proceed to block 516.

At block 516, the anti-theft recovery server 112 may update the recovery database 114 with the registration information embedded in the registration request message. For example, registration information that includes the IMEI of the user device 102, the message service registration identifier, and the time stamp of the registration message may be stored in the recovery database 114. The message service registration identifier may be used by the anti-theft recovery server 112 to order a corresponding cloud messaging service to route messages to the user device 102.

At block 518, the anti-theft recovery server 112 may formulate a registration response message to indicate that registration is complete. The registration response message may include a unique recovery session identifier that is generated by the anti-theft recovery server 112 for the user device 102. The anti-theft recovery server 112 may also store the recovery session identifier for the user device 102 in the recovery database 114. The registration response message is an indication that the recovery application 120 is registered with the anti-theft recovery server 112 such that the anti-theft recovery server 112 may perform remote disablement of anti-theft protection functionalities for the user device 102 via an anti-theft protection disablement command message.

At block 520, the anti-theft recovery server 112 may sign the registration response message with a digital signature. For example, the anti-theft recovery server 112 may generate a MAC using a registration session identifier embedded in the registration request message and the content of the message. Alternatively, the anti-theft recovery server 112 may generate a HMAC based on the registration session identifier, the content of the message, and a private key counterpart of the encryption key 230. In various embodiments, the anti-theft recovery server 112 may use the hardware security module 116 to generate the digital signature.

At block 522, the anti-theft recovery server 112 may send the signed registration response message to the user device 102. In various embodiments, the signed registration response message may be transmitted via the cloud messaging service or the binary messaging service.

Figure 6:
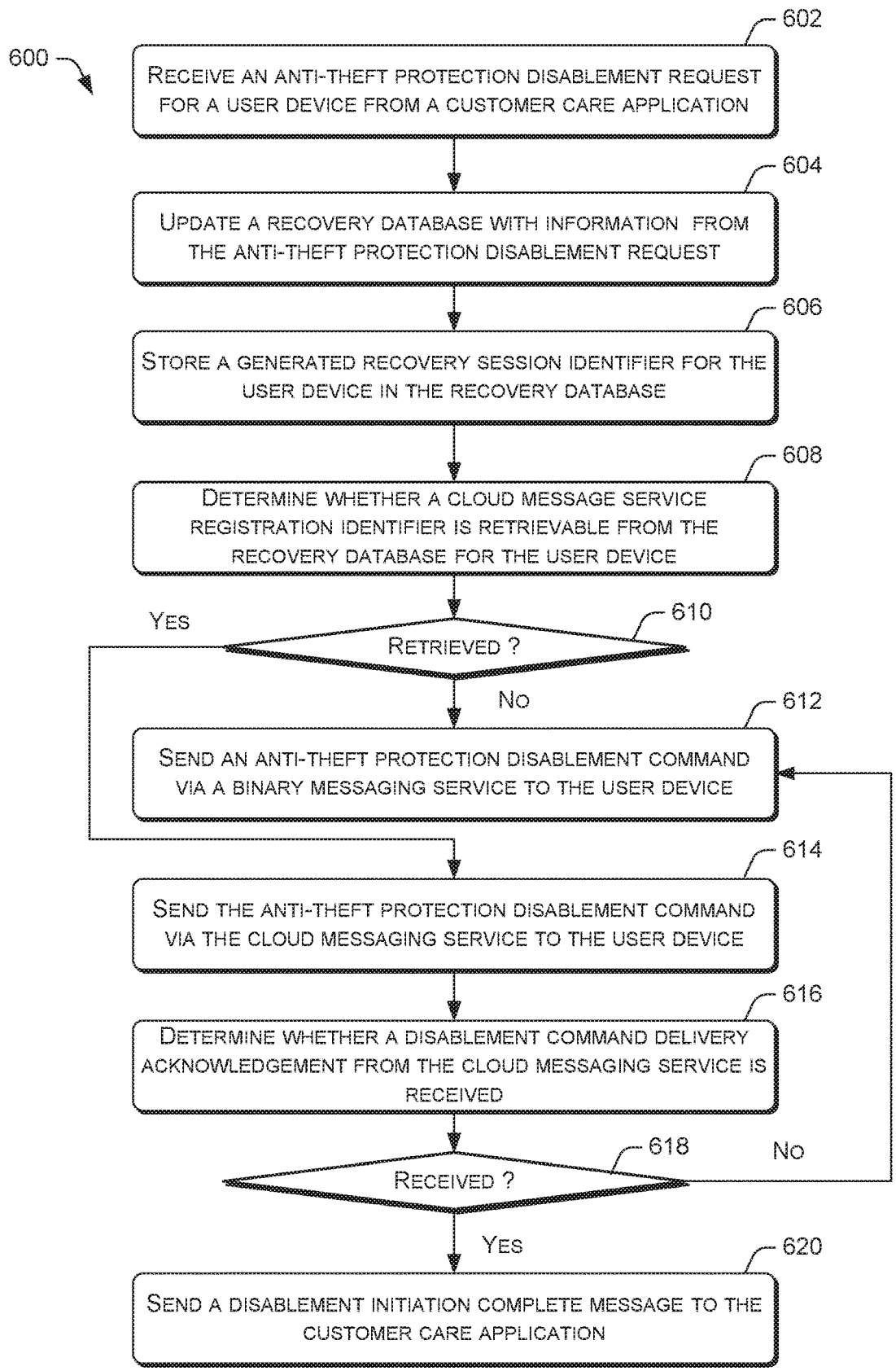
FIG. 6 is a flow diagram of an example process for initiating an anti-theft protection disablement at a customer care application that is used by a customer care representative.

FIG. 6 is a flow diagram of an example process 600 for initiating an anti-theft protection disablement at the customer care application 130 that is used by a customer care representative. At block 602, the anti-theft recovery server 112 may receive an anti-theft protection disablement request for the user device 102 from the customer care application 130. In various embodiments, a customer care representative 132 may initiate the anti-theft protection disablement request upon verifying that a person making the request has the authority to do so. For example, the person may be verified to be an authorized user of the user device 102 or an authorized employee of a telecommunication carrier.

At block 604, the anti-theft recovery server 112 may update the recovery database 114 with information from the anti-theft protection disablement request. In various embodiments, the information may include a timestamp of the request, an application identifier of the customer care application 130, and/or an IMEI of the user device 102.

At block 606, the anti-theft recovery server 112 may store a generated recovery session identifier for the user device 102 in the recovery database 114. At block 608, the anti-theft recovery server 112 may determine whether a cloud messaging registration identifier is retrievable from the recovery database 114 for the user device 102. In various embodiments, the anti-theft recovery server 112 may use a device identifier of the user device 102 to query for an associated cloud messaging registration identifier. Thus, at decision block 610, if the anti-theft recovery server 112 is unable to retrieve a cloud messaging registration identifier for the user device 102 ("no" at decision block 610), the process 600 may proceed to block 612. At block 612, the anti-theft recovery server 112 may send an anti-theft protection disablement command via a binary messaging service to the user device 102.

However, if the anti-theft recovery server 112 is able to retrieve the cloud messaging registration identifier for the user device 102 ("yes" at decision block 610), the process 600 may proceed to block 614. At block 614, the anti-theft recovery server 112 may send the anti-theft protection disablement command via the cloud messaging service to the user device 102. In various embodiments, the cloud messaging service may use the cloud messaging registration identifier to route the transmission of the command to the user device 102.

At block 616, the anti-theft recovery server 112 may determine whether a disablement command delivery acknowledgment is received from the cloud messaging service. The delivery acknowledgement may be used by the anti-theft recovery server 112 as an indication that the user device 102 has received the command. Thus, at decision block 618, if the anti-theft recovery server 112 determines that the delivery acknowledgment is received ("yes" at decision block 618), the process 600 may proceed to block 620. At block 620, the anti-theft recovery server 112 may send a disablement initiation complete message to the customer care application 130. The disablement initiation complete message may be presented by the customer care application 130 to the customer care representative 132.

However, if the anti-theft recovery server 112 determines that the delivery acknowledgment is not received ("no" at decision block 618), the process 600 may loop back to block 612. Once again, at block 612, the anti-theft recovery server 112 may send an anti-theft protection disablement command via a binary messaging service to the user device 102.

Figure 7:
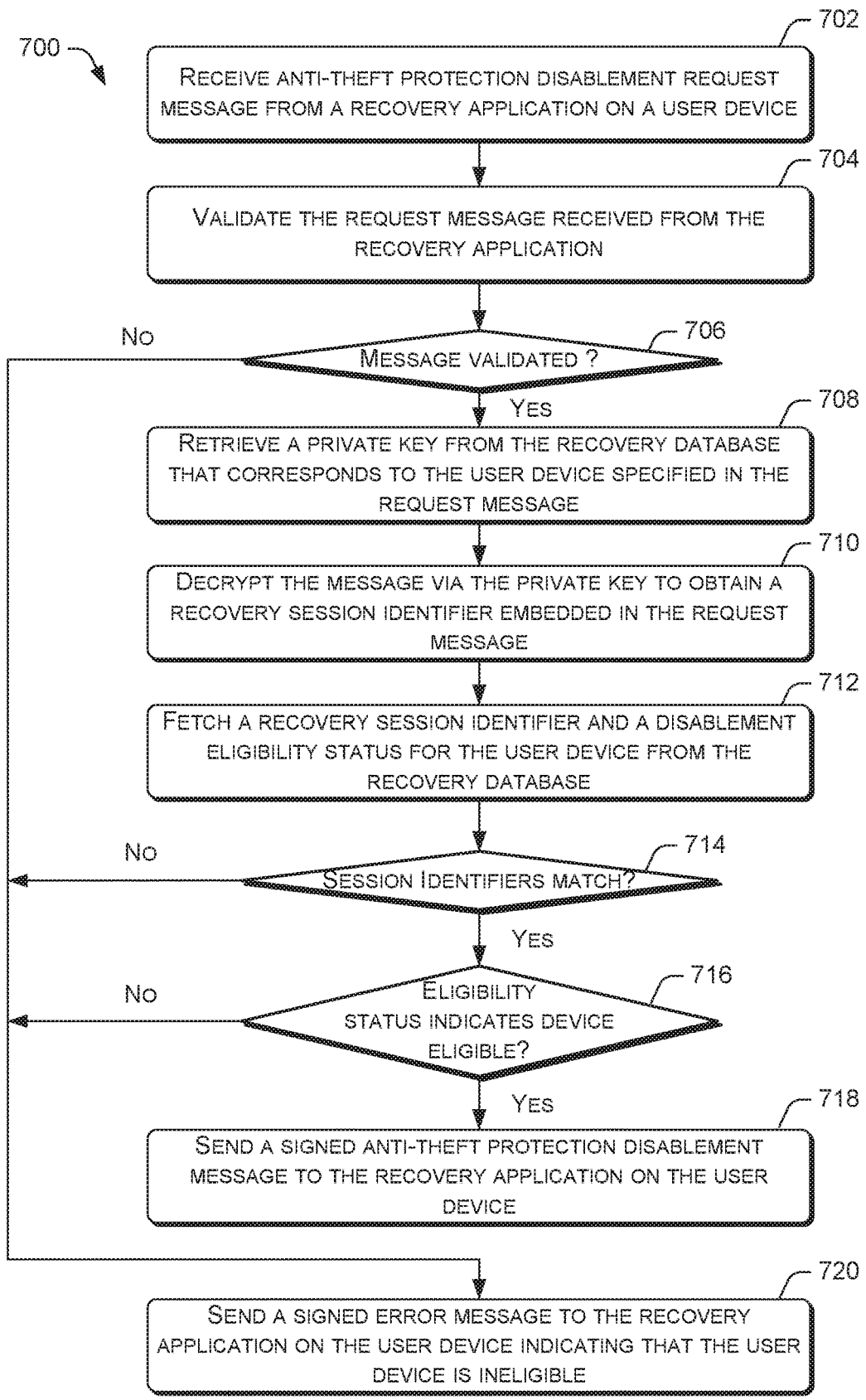
FIG. 7 is a flow diagram of an example process for initiating an anti-theft protection disablement at a recovery application on a user device.

FIG. 7 is a flow diagram of an example process 700 for initiating an anti-theft protection disablement at a recovery application on a user device. At block 702, the anti-theft recovery server 112 may receive an anti-theft protection disablement request for the user device 102 from the recovery application 120. In various embodiments, the recovery application 120 may transmit the anti-theft protection disablement request following the input of alternative authentication credentials by an authorized user.

At block 704, the anti-theft recovery server 112 may validate the anti-theft protection disablement request message. In various embodiments, the anti-theft recovery server 112 may perform the validation based at least on a message type and a message length parsed from the message. For example, the anti-theft recovery server 112 may verify that a type identifier of the registration request message indicates that the message is of a type that may be processed by the anti-theft recovery server 112. Alternatively or concurrently, the anti-theft recovery server 112 may parse embedded message length information from the registration request message. Accordingly, the anti-theft recovery server 112 may determine that the message is valid when the actual number of message bytes received matches the message length information from the disablement request message.

At decision block 706, if the anti-theft recovery server 112 determines that the message is validated ("yes" at decision block 706), the process 700 may proceed to block 708. At block 708, the anti-theft recovery server 112 may retrieve a private key from the recovery database 114 that corresponds to the user device 102 specified in the message. In various embodiments, the disablement request message may include a device identifier (e.g., IMEI) or a model code (e.g., type allocation code), and the anti-theft recovery server 112 may retrieve a private key that corresponds to the device identifier or model code.

At block 710, the anti-theft recovery server 112 may decrypt the registration request message with the private key to obtain request information embedded in the message. The decryption of the message using the private key may be performed by the hardware security module 116. In various embodiments, the request information may include a recovery session identifier, the IMEI of the user device 102, a time stamp of the request message, and/or so forth. The recovery session identifier may be provided by the anti-theft recovery server 112 to the recovery application 120 of the user device 102 during the process 500 described in FIG. 5.

At block 712, the anti-theft recovery server 112 may fetch a recovery session identifier and a disablement eligibility status for the user device 102 from the recovery database 114. The fetched recovery session identifier may be a recovery session identifier that was previously assigned and transmitted to the recovery application 120 at block 518 of the process 500. At decision block 714, the anti-theft recovery server 112 may determine whether the recovery session identifier that is received from the user device 102 matches the recovery session identifier that is retrieved from the recovery database 114. In various embodiments, the anti-theft recovery server 112 may perform the matching by calculating a first HMAC based on the recovery session identifier received from the user device 102 and the content of the message, as well as calculating a second HMAC based on the recovery session identifier retrieved from the recovery database 114 and the content of the message. The anti-theft recovery server 112 may compare the two HMACs and determine that the recovery session identifiers match if the two HMACs match. In alternative embodiments, the matching may be performed via the generation and matching of MACs instead of HMACs. Thus, if the anti-theft recovery server 112 determines that the recovery session identifiers match ("yes" at decision block 714), the process 700 may proceed to decision block 716.

At decision block 716, the anti-theft recovery server 112 may determine whether the eligibility status indicates that the user device 102 is eligible for anti-theft protection disablement based on the disablement eligibility status stored in the user device 102. Thus, if the anti-theft recovery server 112 determines that the user device 102 is eligible for anti-theft protection disablement ("yes" at decision block 716), the process 700 may proceed to block 718.

At block 718, the anti-theft recovery server 112 may send a signed anti-theft protection disablement message to the recovery application 120 on the user device 102. The disablement message may include a command that causes the recovery application 120 to disable the anti-theft protection credential input condition for resetting the user device 102 to the default factory setting. In various embodiments, the anti-theft recovery server 112 may sign the anti-theft protection disablement message with a digital signature. For example, the anti-theft recovery server 112 may generate a MAC using the recovery session identifier and the content of the message. Alternatively, the anti-theft recovery server 112 may generate a HMAC based on the recovery session identifier, the content of the message, and a private key counterpart of the encryption key 230. The anti-theft recovery server 112 may use the hardware security module 116 to generate the digital signature. Accordingly, the hardware security module 116 may include various encryption (e.g., asymmetric encryption, symmetric encryption, etc.) and hashing algorithms (e.g., MD5, SHA, etc.). The anti-theft protection disablement message may be transmitted via the cloud messaging service or the binary messaging service.

Returning to decision block 706, if the anti-theft recovery server 112 determines that the message is invalid ("no" at decision block 506), the process 700 may proceed directly to block 720. At block 720, the anti-theft recovery server 112 may send an error message to the recovery application 120 on the user device 102. The error message may indicate that the user device 102 is ineligible for the anti-theft protection disablement. The error message may be signed with a digital signature. In various embodiments, the anti-theft recovery server 112 may sign the error message with a digital signature. For example, the anti-theft recovery server 112 may generate a MAC using the recovery session identifier and the content of the message. Alternatively, the anti-theft recovery server 112 may generate a HMAC based on the recovery session identifier, the content of the message, and a private key counterpart of the encryption key 230. The anti-theft recovery server 112 may use the hardware security module 116 to generate the digital signature. The error message may be transmitted via the cloud messaging service or the binary messaging service.

Returning to decision block 714, if the anti-theft recovery server 112 determines that the recovery session identifiers do not match ("no" at decision block 714), the process 700 may also proceed to block 720. Returning to decision block 716, if the anti-theft recovery server 112 determines that the user device 102 is ineligible for anti-theft protection disablement ("no" at decision block 716), the process 700 may also proceed to block 720.

Figure 8:
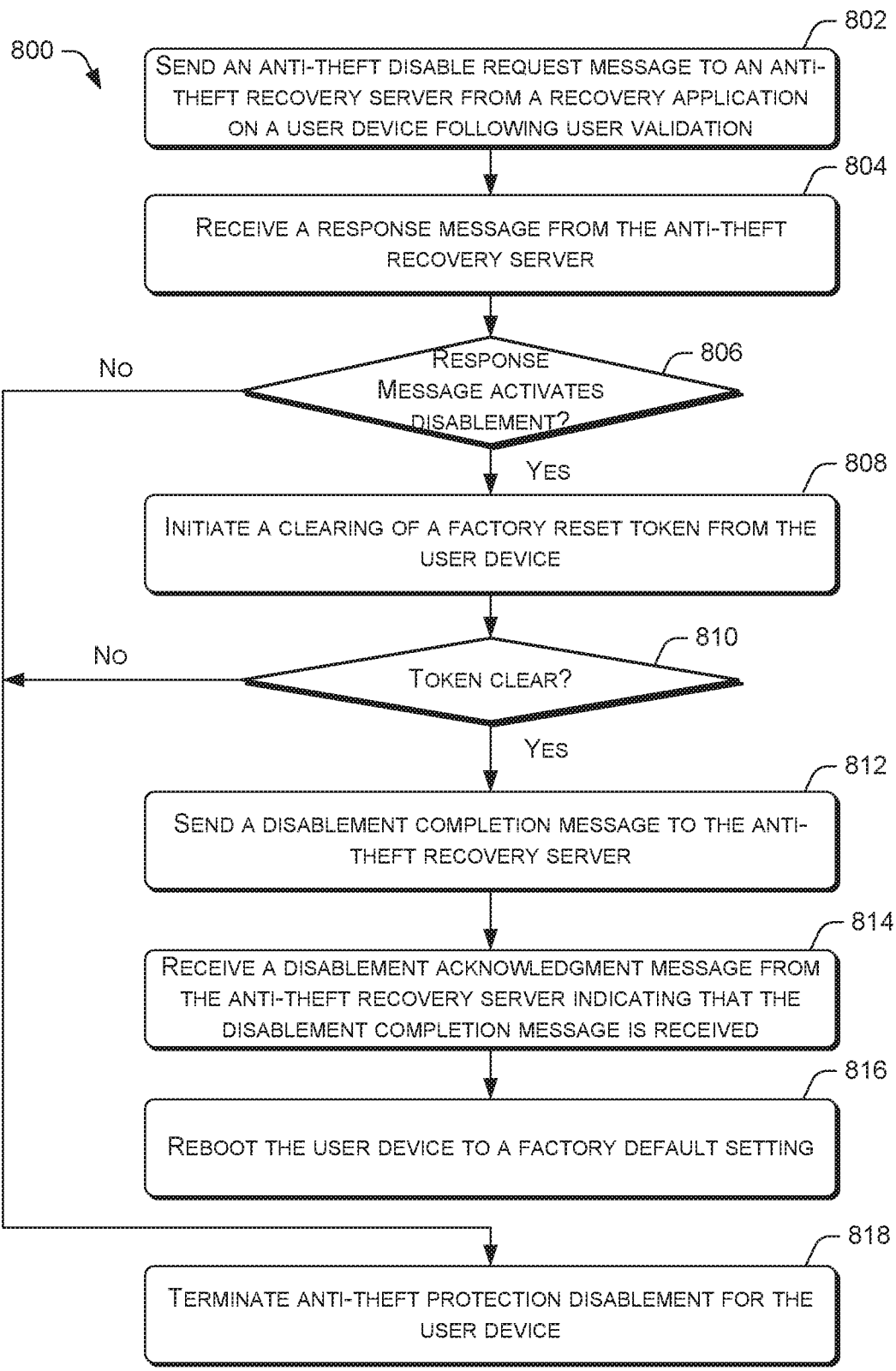
FIG. 8 is a flow diagram of an example process for disabling anti-theft protection on a user device.

FIG. 8 is a flow diagram of an example process 800 for disabling anti-theft protection on a user device. At block 802, the recovery application 120 on a user device 102 may send an anti-theft disablement request message to an anti-theft recovery server 112. In various embodiments, the recovery application 120 may send the request message after authenticating a requesting user via alternative authentication credentials. The alternative authentication credentials may be credentials other than the anti-theft protection authentication credential. For example, an alternative authentication credential may be an account password that user has established with the telecommunication carrier. The anti-theft disablement request message may be sent to the anti-theft recovery server 112 via a cloud messaging service or a binary messaging service.

At block 804, the recovery application 120 may receive a response message from the anti-theft recovery server 112. The response message may be received via a cloud messaging service or a binary messaging service. In various embodiments, the response message may be digitally signed, and the recovery application 120 may validate the response message using a recover session identifier, the encryption key 230, an encryption algorithm, and/or a hashing algorithm. The response message may be received from the anti-theft recovery server 112 via a cloud messaging service or a binary messaging service.

At decision block 806, the recovery application 120 may determine whether the response message includes a command that activates anti-theft protection disablement. The anti-theft protection disablement may disable one or more functionalities provided by the anti-theft protection module 118. Thus, if the recovery application 120 determines that the response message includes an anti-theft disablement command that activates anti-theft protection disablement ("yes" at decision block 806), the process 800 may proceed to block 808. At block 808, the recovery application 120 may initiate a clearing of a factory reset token 126 from the user device 102. In various embodiments, the factory reset token 126 controls whether a factory default reset or a subsequent device setup initiated by the factory default reset can be performed without the input of an anti-theft protection credential. Thus, the clearing of the factory reset token 126 may enable the reset to be performed without input of the credential.

At decision block 810, the recovery application 120 may determine whether the factory reset token 126 is cleared from the user device 102. Thus, if the factory reset token 126 is cleared ("yes" at decision block 810), the process 800 may proceed to block 812. At block 812, the recovery application 120 may send a disablement completion message to the anti-theft recovery server 112. In various embodiments, the disablement completion message may be encrypted via the encryption key 230 by the recovery application 120.

At block 814, the recovery application 120 may receive a disablement acknowledgement message from the anti-theft recovery server indicating that the disablement complete message is received. In various embodiments, the disablement acknowledgement message may be digitally signed, and the recovery application 120 may validate the disablement acknowledgement message using a recover session identifier, the encryption key 230, an encryption algorithm, and/or a hashing algorithm.

At block 816, the recovery application 120 may initiate a rebooting of the user device 102 to perform the reset to the default factory setting for the device. Since the anti-theft protection functionalities that prohibits reset of the device is disabled, the reboot may enable the user device 102 to boot into the default factory setting.

Returning to decision block 806, if the recovery application 120 determines that the response message does not include an anti-theft disablement command that activates anti-theft protection disablement ("no" at decision block 806), the process 800 may proceed to block 818. At block 818, the recovery application 120 may terminate the anti-theft protection disablement for the user device 102.

Figure 9:
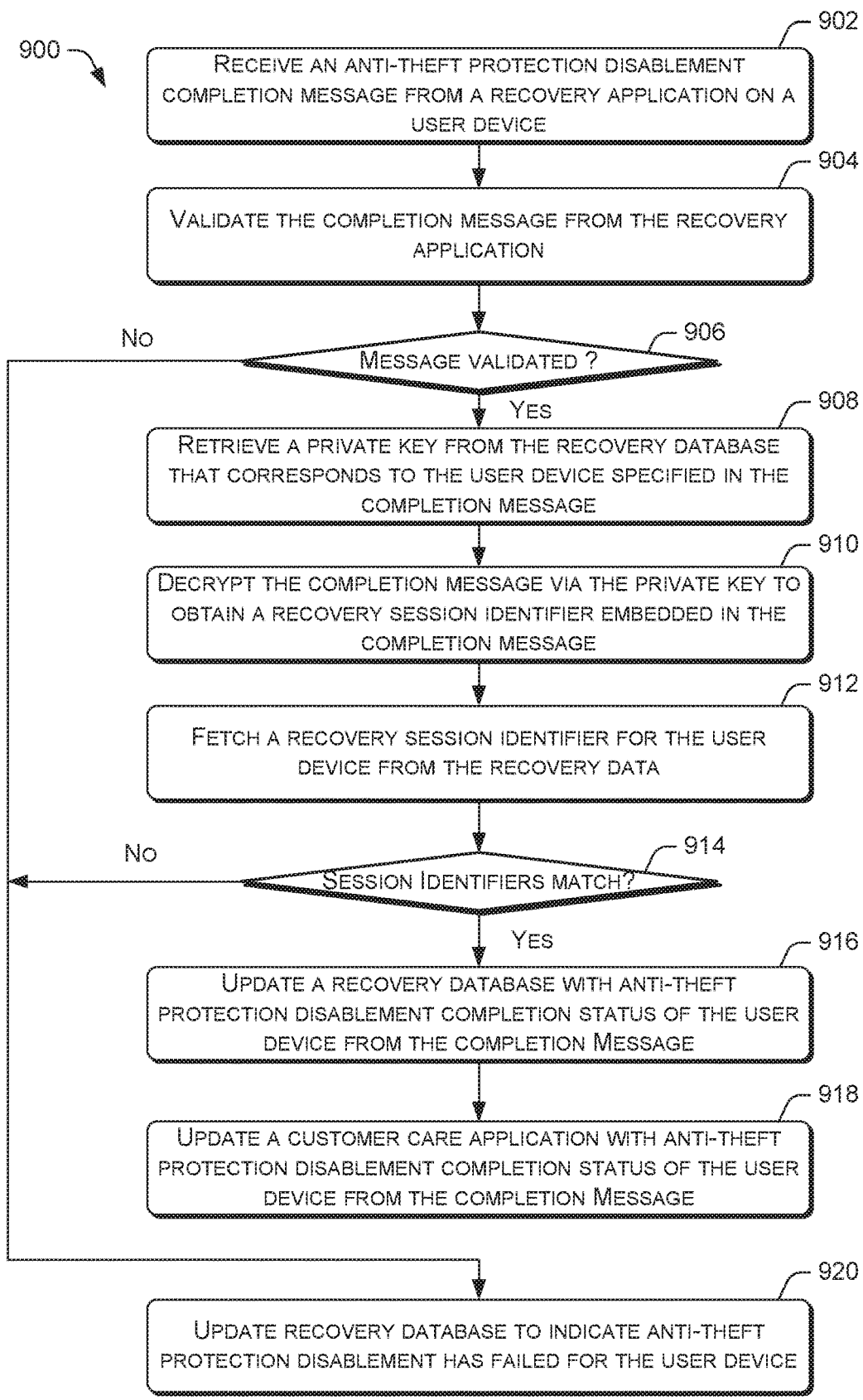
FIG. 9 is a flow diagram of an example process for updating customer care application that is used by a customer care representative with an outcome of an anti-theft protection disablement procedure.

FIG. 9 is a flow diagram of an example process 900 for updating customer care application that is used by a customer care representative with an outcome of an anti-theft protection disablement procedure. At block 902, the anti-theft recovery server 112 may receive an anti-theft protection disablement completion message from the recovery application 120 on the user device 102. The recovery application 120 send the disablement completion message after clearing the factory reset token 126 from the user device 102.

At block 904, the anti-theft recovery server 112 may validate the anti-theft protection disablement completion message. In various embodiments, the anti-theft recovery server 112 may perform the validation based at least on a message type and a message length parsed from the message. For example, the anti-theft recovery server 112 may verify that a type identifier of the disablement completion message indicates that the message is of a type that may be processed by the anti-theft recovery server 112. Alternatively or concurrently, the anti-theft recovery server 112 may parse embedded message length information from the disablement complete message. Accordingly, the anti-theft recovery server 112 may determine that the message is valid when the actual number of message bytes received matches the message length information from the disablement completion message.

At decision block 906, if the anti-theft recovery server 112 determines that the message is validated ("yes" at decision block 906), the process 900 may proceed to block 908. At block 908, the anti-theft recovery server 112 may retrieve a private key from the recovery database 114 that corresponds to the user device 102 specified in the message. In various embodiments, the disablement completion message may include a device identifier (e.g., IMEI) or a model code (e.g., type allocation code), and the anti-theft recovery server 112 may retrieve a private key that corresponds to the device identifier or model code.

At block 910, the anti-theft recovery server 112 may decrypt the disablement completion message with the private key to obtain request information embedded in the message. The decryption of the message using the private key may be performed by the hardware security module 116. In various embodiments, the request information may include a recovery session identifier, the IMEI of the user device 102, a time stamp of the request message, and/or so forth. The recovery session identifier may be provided by the anti-theft recovery server 112 to the recovery application 120 of the user device 102 during the process 500 described in FIG. 5.

At block 912, the anti-theft recovery server 112 may fetch a recovery session identifier for the user device 102 from the recovery database 114. The fetched recovery session identifier may be a recovery session identifier that was previously assigned and transmitted to the recovery application 120 at block 518 of the process 500. At decision block 714, the anti-theft recovery server 112 may determine whether the recovery session identifier that is received from the user device 102 matches the recovery session identifier that is retrieved from the recovery database 114. In various embodiments, the anti-theft recovery server 112 may perform the matching by calculating a first HMAC based on the recovery session identifier received from the user device 102 and the content of the message, as well as calculating a second HMAC based on the recovery session identifier retrieved from the recovery database 114 and the content of the message. The anti-theft recovery server 112 may compare the two HMACs and determine that the recovery session identifiers match if the two HMACs match. In alternative embodiments, the matching may be performed via the generation and matching of MACs instead of HMACs. Thus, if the anti-theft recovery server 112 determines that the recovery session identifiers match ("yes" at decision block 914), the process 900 may proceed to block 916.

At block 916, the anti-theft recovery server 112 may update the recovery database 114 with the disablement completion status of the user device 102 from the completion message. At block 918, the anti-theft recovery server 112 may update the customer care application 130 with the disablement completion status of the user device 102 from the completion message. In various embodiments, the anti-theft recovery server 112 may send a signed disablement acknowledgment message to the recovery application 120 on the user device 102. In various embodiments, the anti-theft recovery server 112 may sign the disablement acknowledgment message with a digital signature. For example, the anti-theft recovery server 112 may generate a MAC using the recovery session identifier and the content of the message. Alternatively, the anti-theft recovery server 112 may generate a HMAC based on the recovery session identifier, the content of the message, and a private key counterpart of the encryption key 230. The anti-theft recovery server 112 may use the hardware security module 116 to generate the digital signature. The disablement acknowledgment message may be transmitted via the cloud messaging service or the binary messaging service to the user device 102.

Returning to decision block 906, if the anti-theft recovery server 112 determines that the message is invalid ("no" at decision block 906), the process 900 may proceed directly to block 920. At block 920, the anti-theft recovery server 112 may update the recovery database 114 to indicate that the anti-theft protection disablement has failed for the user device 102. Likewise, returning to decision block 914, if the anti-theft recovery server 112 determines that the recovery session identifiers do not match ("no" at decision block 914), the process 900 may also proceed directly to block 920.

Figure 10:
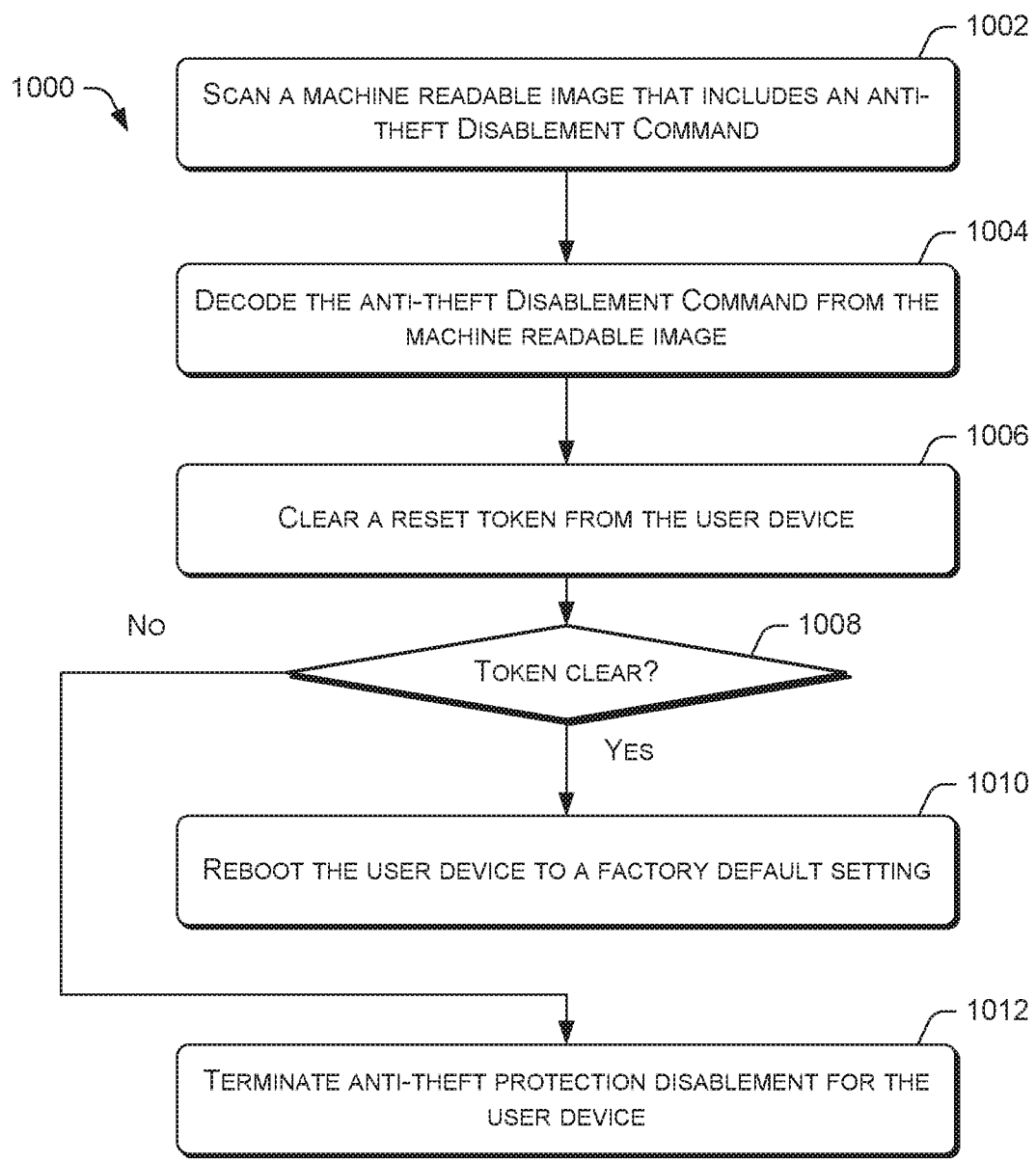
FIG. 10 is a flow diagram of an example process for using a third-party computing device to initiate a disablement of anti-theft protection on a user device.

FIG. 10 is a flow diagram of an example process 1000 for using a third-party computing device to initiate a disablement of anti-theft protection on a user device. At block 1002, the recovery application 120 may scan a machine readable image that includes an anti-theft disablement command. In various embodiments, the machine-readable image may be a two-dimensional code, such as a QR® code, an Aztec code, a MaxiCode, and/or so forth. The code that is embedded in the machine-readable image may be a one-time use code. The machine-readable image may be displayed by a third-party computing device 134, and the recovery application 120 may use a camera of the user device 102 to scan the machine-readable image. In alternative embodiments, the recovery application 120 may receive the anti-theft disablement command from the third-party computing device 134 via a communication connection between the third-party computing device 134 and the user device 102.

At block 1004, the recovery application 120 may decode the anti-theft disablement command from the machine-readable image. In various embodiments, the recovery application 120 may using an image recognition and decryption algorithm to perform the decoding. At block 1006, the recovery application 120 may initiate a clearing of a factory reset token 126 from the user device 102. In various embodiments, the factory reset token 126 controls whether a factory default reset can be performed without the input of anti-theft protection credentials. Thus, the clearing of the factory reset token 126 may enable the reset to be performed without input of the credential.

At decision block 1008, the recovery application 120 may determine whether the factory reset token 126 is cleared from the user device 102. Thus, if the factory reset token 126 is cleared ("yes" at decision block 1008), the process 800 may proceed to block 1010. At block 1010, the recovery application 120 may initiate a rebooting of the user device 102 to perform the reset to the default factory setting for the device. Since the anti-theft protection functionalities that prohibits reset of the device is disable, the reboot may enable the user device 102 to boot into the default factory setting. In some embodiments, the recovery application 120 may also send a disablement completion message to the anti-theft recovery server 112 and receive a disablement acknowledgement message from the anti-theft recovery server 112, as described in blocks 812 and 814, respectively.

Returning to block 1002, if the recovery application 120 determines that the machine-readable image or other data that is received from the third-party computing device 134 does not include an anti-theft disablement command that activates anti-theft protection disablement ("no" at decision block 806), the process 1000 may proceed to block 1012. At block 1012, the recovery application 120 may terminate the anti-theft protection disablement for the user device 102.

The techniques may enable an authorized user to disable the anti-theft functionalities of a user device without contacting customer service in instances in which the authorized user has forgotten the anti-theft protection credential. Accordingly, the techniques may reduce the number of customer service calls that are placed to the customer support center of a telecommunication carrier. Additionally, the techniques may enable a telecommunication carrier to perform reset of user devices that are traded in with active anti-theft functionalities without knowledge of the corresponding anti-theft protection credentials. Thus, the techniques may reduce overhead and increase revenue for the telecommunication carrier.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   registering a recovery application to receive a disablement message disabling an authentication credential requirement to reboot a user device and thereby enabling the reboot without the authentication credential;
   receiving, from the recovery application, a request to send the disablement message to the recovery application;
   confirming registration of the recovery application in response to receiving the request;
   confirming authenticity of the request in accordance with the confirmed registration; and
   sending the disablement message to the user device in accordance with the confirmation of the authenticity of the request,
   wherein the disablement message includes a digital signature that is configured to be used by the recovery application to authenticate the disablement message.

2. The one or more non-transitory computer-readable media of claim 1, wherein the disablement message is configured to control the recovery application to disable an anti-theft protection functionality causing the device to enter into a factory default state prior to reboot.

3. The one or more non-transitory computer-readable media of claim 1, wherein:
   the request is encrypted via a public key of a public-private key pair,
   the confirming authenticity of the request includes decrypting the request via a private key of the public-private key pair to obtain a decrypted session identifier, and
   the sending of the disablement message is in response to determining that the decrypted session identifier matches a previously generated session identifier.

4. The one or more non-transitory computer-readable media of claim 1, wherein the sending of the disablement message includes using a messaging service to route the disablement message to the user device based at least on a message service registration identifier received from the recovery application.

5. The one or more non-transitory computer-readable media of claim 4, wherein the messaging service is a Google Cloud Messaging (GCM) service, and wherein sending of the disablement message includes sending the disablement message to the user device via a binary Short Message Service (SMS) messaging service in response to determining that disablement message is unable to be sent via the GCM service.

6. The one or more non-transitory computer-readable media claim 1, wherein the acts further comprise:
receiving a completion message from the recovery application that indicates a disablement of the authentication credential requirement;
authenticating the completion message; and
updating at least one of a database or an additional application that is used by a customer service representative of a wireless carrier network with an indication that the authentication credential requirement is disabled on the user device in response to authenticating the completion message.

7. The one or more non-transitory computer-readable media of claim 6, wherein the completion message is encrypted via a public key of a public-private key pair, and the authenticating the completion message includes decrypting the completion message via a private key of the public-private key pair to obtain a decrypted session identifier, and wherein the updating includes updating the at least one of the database or the application in response to determining that the decrypted session identifier matches a previously generated session identifier.

8. The one or more non-transitory computer-readable media of claim 6, wherein the authenticating the completion message includes at least one of verifying a message type of the completion message is a permitted type or verifying a message length of the completion message matches message length information embedded in the completion message.

9. The one or more non-transitory computer-readable media of claim 1, wherein the receiving includes receiving the request message from the recovery application following an input of an alternative authentication credential of a user into the recovery application, the alternative authentication credential differs from the authentication credential of the user of the user device.

10. The one or more non-transitory computer-readable media of claim 1, wherein the confirming authenticity of the request includes at least one of verifying a message type of the request is a permitted type or verifying a message length of the request matches message length information embedded in the request.

11. A system, comprising:
one or more processors; and
memory including a plurality of computer-executable instructions that are executable by the one or more processors to perform a plurality of actions, the plurality of actions comprising:
receiving a request message for a user device from an application that resides on a computing device, the request message including a request for a disablement message that triggers a recovery application on the user device to disable an anti-theft function, the anti-theft function requiring an authentication credential to initialize a reboot of the user device, thereby enabling the reboot without the authentication credential; and
sending the disablement message to the user device via one of a plurality of messaging services determined by a service registration status of the requesting source,
wherein the disablement message includes a digital signature that is configured to be used by the recovery application to authenticate the disablement message.

12. The system of claim 11, wherein the messaging service is a Google Cloud Messaging (GCM) service.

13. The system of claim 11, wherein the actions further comprise:
receiving a completion message from the application that indicates the application has disabled the anti-theft function;
receiving a delivery acknowledgment from the recovery application following the sending of the disablement message via the messaging service and prior to the receiving of the completion message; and
sending a disablement initiation complete message to the recovery application in response to receiving the delivery acknowledgment.

14. The system of claim 11, wherein the receiving includes receiving the request from the recovery application following a validation of a user at the user device through an alternative authentication credential of the user that differs from the authentication credential.

15. The system of claim 11, wherein the disablement message causes the user device to clear a factory reset token stored in the user device to disable the function.

16. One or more non-transitory computer-readable media storing a computer-executable recovery application that upon execution cause one or more processors to perform acts comprising:
requesting registration of the recovery application to receive a disablement message disabling an anti-theft functionality to factory reset a user device and thereby enabling the factory reset;
providing an authentication credential to authenticate the request for registration;
requesting the disablement message to be sent to the recovery application;
receiving the disablement message at the recovery application; and
applying the disablement message to the anti-theft functionality,
wherein the disablement message includes a digital signature that is configured to be used by the user device to authenticate the disablement message.

17. The one or more non-transitory computer-readable media of claim 16, wherein the disablement message is configured to control the recovery application to cause the user device to enter into a factory default state and enable a reboot of the user device.

18. The one or more non-transitory computer-readable media of claim 16, wherein the acts further comprise:
registering the recovery application with a messaging service, wherein the disablement message is requested via the messaging service; and
receiving, via the messaging service, the disablement message in accordance with the registration.

* * * * *